US008307203B2

(12) United States Patent  (10) Patent No.: US 8,307,203 B2
Fraleigh et al.  (45) Date of Patent: Nov. 6, 2012

(54) METHODS AND SYSTEMS FOR SECURE COMMUNICATIONS USING A LOCAL CERTIFICATION AUTHORITY

(75) Inventors: Charles Fraleigh, Sunnyvale, CA (US); Nitin Gupta, Fremont, CA (US); Case Larsen, Union City, CA (US); Shashidhar Merugu, Mountain View, CA (US); Eric Ogren, San Francisco, CA (US); Paras Shah, Mountain View, CA (US); Oleg Smolsky, Santa Clara, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 568 days.

(21) Appl. No.: 12/502,983

(22) Filed: Jul. 14, 2009

(65) Prior Publication Data
US 2010/0049970 A1  Feb. 25, 2010

Related U.S. Application Data

(60) Provisional application No. 61/080,651, filed on Jul. 14, 2008.

(51) Int. Cl.
*H04L 29/06* (2006.01)
(52) U.S. Cl. ........ 713/156; 713/157; 713/158; 713/159; 726/10; 726/27; 726/28; 726/29; 726/30
(58) Field of Classification Search .................... 713/156
See application file for complete search history.

(56) References Cited

U.S. PATENT DOCUMENTS

| | | | |
|---|---|---|---|
| 6,094,485 A | 7/2000 | Weinstein et al. | |
| 6,104,716 A | 8/2000 | Crichton et al. | |
| 6,105,067 A | 8/2000 | Batra | |
| 6,584,567 B1 | 6/2003 | Bellwood et al. | |
| 6,643,701 B1 | 11/2003 | Aziz et al. | |
| 6,681,327 B1 | 1/2004 | Jardin | |
| 6,704,798 B1 | 3/2004 | Mogul | |
| 7,010,608 B2 | 3/2006 | Garg et al. | |
| 7,370,351 B1 | 5/2008 | Ramachandran et al. | |
| 7,386,721 B1 | 6/2008 | Vilhuber et al. | |
| 7,661,131 B1 | 2/2010 | Shaw et al. | |
| 8,020,201 B2 | 9/2011 | Adusumilli et al. | |
| 2001/0047474 A1 | 11/2001 | Takagi et al. | |

(Continued)

FOREIGN PATENT DOCUMENTS

CN  1615632 A  5/2005

(Continued)

OTHER PUBLICATIONS

"International Application Serial No. PCT/US2009/004084, Search Report mailed Aug. 24, 2009".

(Continued)

*Primary Examiner* — Longbit Chai
(74) *Attorney, Agent, or Firm* — Park, Vaughan, Fleming & Dowler LLP

(57) ABSTRACT

A local network traffic processor and an application are resident on a common computer system. The application is configured to trust a server certificate issued by a local network traffic processor, the local network traffic processor operatively being paired with a remote network traffic processor. A proxy server certificate, generated using identification information of a server associated with the remote network traffic processor and signed by the local certification authority, is used to establish a secure session between a local network traffic processor and the application.

24 Claims, 16 Drawing Sheets

U.S. PATENT DOCUMENTS

| | | | |
|---|---|---|---|
| 2002/0016911 | A1 | 2/2002 | Chawla et al. |
| 2002/0035681 | A1 | 3/2002 | Maturana et al. |
| 2002/0163884 | A1 | 11/2002 | Peles |
| 2003/0014628 | A1 | 1/2003 | Freed et al. |
| 2003/0196084 | A1 | 10/2003 | Okereke et al. |
| 2003/0233539 | A1 | 12/2003 | Tardo et al. |
| 2004/0243703 | A1 | 12/2004 | Demmer |
| 2005/0108517 | A1 | 5/2005 | Dillon et al. |
| 2005/0138353 | A1 | 6/2005 | Spies |
| 2006/0069719 | A1 | 3/2006 | McCanne et al. |
| 2006/0101510 | A1* | 5/2006 | Kadyk et al. ............ 726/12 |
| 2006/0168210 | A1 | 7/2006 | Ahonen et al. |
| 2006/0209789 | A1 | 9/2006 | Gupta et al. |
| 2007/0038853 | A1 | 2/2007 | Day et al. |
| 2007/0179955 | A1 | 8/2007 | Croft et al. |
| 2007/0199061 | A1 | 8/2007 | Byres et al. |
| 2009/0013399 | A1 | 1/2009 | Cottrell et al. |

FOREIGN PATENT DOCUMENTS

| | | |
|---|---|---|
| JP | 2001333110 A | 11/2001 |
| WO | WO-2005060202 A1 | 6/2005 |
| WO | WO-2010008539 A1 | 1/2010 |

OTHER PUBLICATIONS

"International Application Serial No. PCT/US2009/004084, Written Opinion mailed Aug. 24, 2009".0

Riverbed, "Riverbed Certified Solutions Study Guide", Exam 199-01 for RiOS v3.0, Version 1.0.12, <URL: hltp:∥www.riverbed . comidocsIRCSP-StudyGu ide-v1 .0.13 .pdf>, (Apr. 2008).

"International Application Serial No. PCT/US2009/004084, International Preliminary Report on Patentability mailed Jan. 27, 2011", 7 pgs.

"U.S. Appl. No. 12/826,430, Non-Final Office Action mailed Jan. 17,2012", 23 pgs.

"Chinese Application Serial No. 200680037143.3, Office Action mailed Jun. 2, 2011", Jun. 2, 2011.

"Chinese Application Serial No. 200680037143.3, Office Action mailed Nov. 6, 2009", 7 pgs.

"European Application Serial No. 06788639.0, Office Action mailed Jun. 10, 2011", 27 pgs.

"International Application Serial No. PCT/US2006/029158, International Search Report and Written Opinion mailed Jul. 13, 2007".

"Israeli Application Serial No. 189388, Office Action mailed Feb. 2, 2012", 2 pgs.

"Japanese Application Serial No. 2008-526050, Office Action mailed Feb. 24, 2011", 11 pgs.

Dierks, "The Transport Layer Security (TSL) Protocol Version 1.2", Network Working Group Request for Comments: 5246, (Aug. 2008), 90 pgs.

Kuramochi, Yuichi, et al., "Infrastructure Elements of EC sites(8) the SSL accelerator taking over cryptography", NIKKEI Communications, (Jul. 2001), 228-229.

* cited by examiner

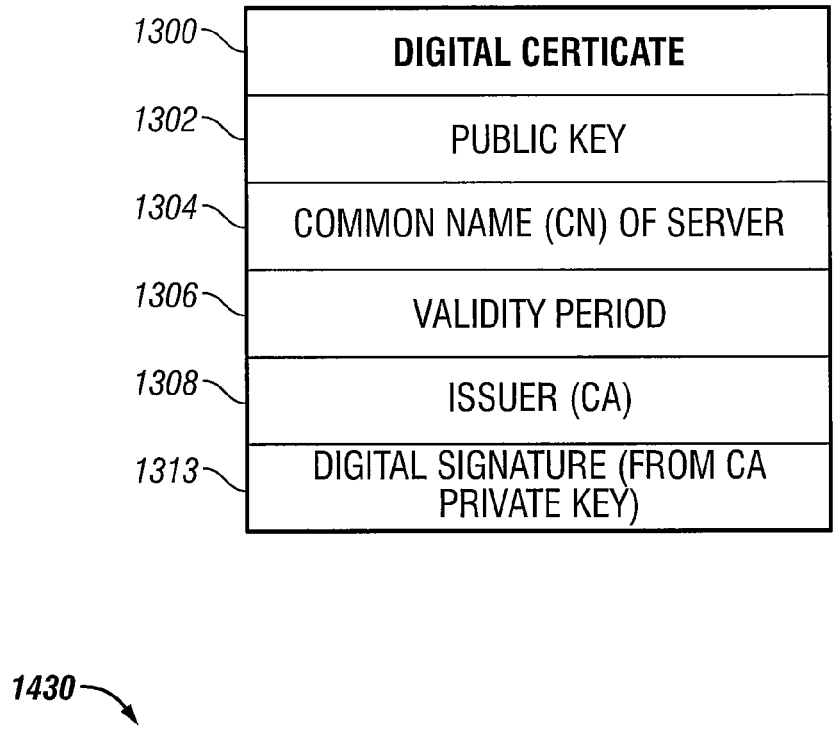

FIG. 13

| Version | V3 |
|---|---|
| Serial Num | 0d 12 f1 b9 4b 82 1f f2 e3 71 ee b4 ad 00 d5 c0 |
| Signature Algorithm | SHA-1 with RSA encryption |
| Issuer | Verisign Inc. / Verisign Trust Network |
| Valid From | Sun Feb 13, 2004 4:00:00 pm |
| Valid To | Wed Feb 14, 2007 3:59:59 pm |
| Subject | www.citibank.com   Citigroup / Silver Spring / MD / USA |
| Public Key | RSA (1024 bits) [30 81 89 02 ... 03 01 00 01] |
| Key Usage | Digital Signature, Key Encipherment |
| CRL Distribution Point | http://crl.verisign.com/Class3InternationalServer.crl |
| Thumbprint | SHA 1 [4b ca 69 24 15 39 d5 9f 3f fd 06 a3 c8 4d 79 60 b3 37 f7 ee] |
| Certiciation Path Parent | Verisign Class 3 Public Primary CA Certificate |
| Digital Signature | SHA-1 with RSA encryption [30 38 c3 d5 ... 5e 18 53 f8] |

FIG. 14

METHODS AND SYSTEMS FOR SECURE COMMUNICATIONS USING A LOCAL CERTIFICATION AUTHORITY

CROSS-REFERENCE TO RELATED APPLICATIONS

This patent application claims the benefit of priority, under 35 U.S.C. Section 119(e), to Fraleigh, U.S. Provisional Patent Application Ser. No. 61/080,651, entitled "LOCAL CERTIFICATION AUTHORITY (CA) FOR NETWORK TRAFFIC APPLICATION," filed on Jul. 14, 2008, which is incorporated by reference in its entirety.

This application incorporates by reference for all purposes U.S. patent application Ser. No. 11/489,414, filed Jul. 18, 2006, and entitled "Split Termination for Secure Communication Protocols".

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, Riverbed Technology, All Rights Reserved.

BACKGROUND

Example embodiments relate to the field of data networks, and to methods and systems for secure communications over data networks.

For establishing secure communication across untrusted networks, one approach is to use a protocol that deploys either or both of public-key cryptographic techniques and symmetric-key cryptographic techniques. Public-key cryptography may provide certain security advantages over symmetric-key cryptography, but is typically more computationally expensive than symmetric-key cryptography. For this reason, the two types of cryptography may be combined by using public-key techniques to negotiate a symmetric cipher between two entities. The symmetric-key cipher may be used, for example, for bulk data transfers between entities. Secure Socket Layer (SSL) and Transport Layer Security (TLS) are examples of secured communication protocols that deploy such a combination of public-key and symmetric-key.

Different devices and techniques may be used to terminate secured connections for different reasons. For example, secured communication protocols introduce computational overhead and cost to each secured connection. For server computers providing many simultaneous secured connections to client computers, the additional computational overhead imposed by secured communication protocols may become significant. To decrease the computational overhead of such secured connections, devices may be employed in-path to terminate a secured connection downstream of the server computer, and thus alleviate some of the computational overhead on the server. In general, a secured connection termination device may appear to a client system as a server providing a secured connection. Such secured connection termination devices may also manage cryptographic and security related aspects of a connection.

It may also be useful to terminate a secured connection in order to perform any number of operations relating to network traffic. Network traffic on a secured connection is, by definition, unintelligible due to encryption. In order to perform operations relating to that network traffic, the network traffic may need to be taken out of the secured connection (e.g., for example to be decrypted). Examples of operations that may be performed on network traffic may include optimization or acceleration operations, or network security operations (e.g., intrusion detection or analysis, sniffing etc.), for example.

BRIEF DESCRIPTION OF DRAWINGS

Some embodiments are illustrated by way of example and not limitation in the figures of the accompanying drawings in which:

FIGS. 13 and 14 are diagrammatic representations of digital certificates that may be issued by a local certificate authority, according to an example embodiment.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details. An understanding of example embodiments may be facilitated by a description, explained in terms of trust, of progressively more complex SSL implementations. The following explanation assumes a minimal number of assumptions and variations.

Figure 1:
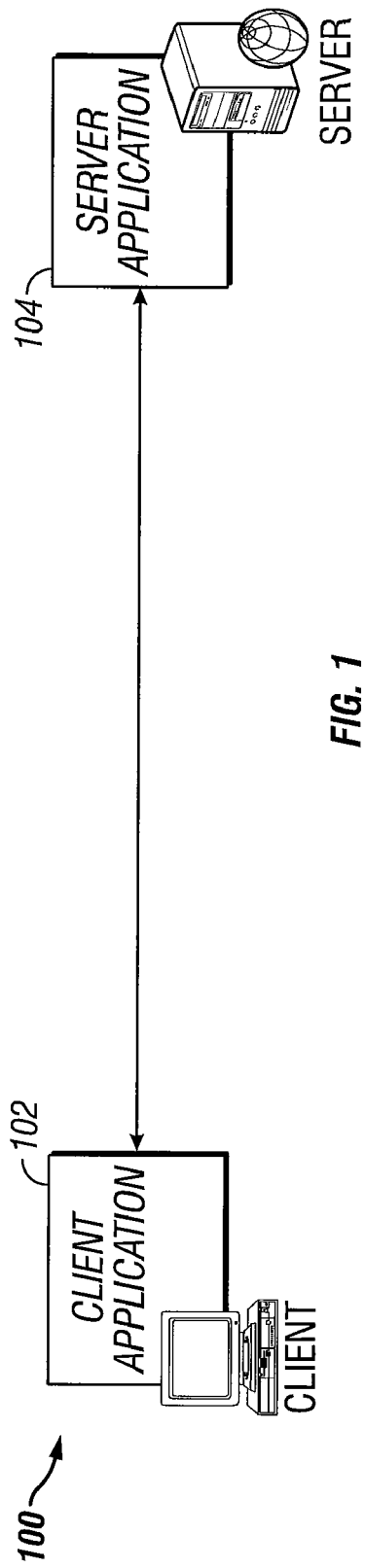
FIGS. 1-3 are diagrammatic representations of various networked client-server arrangements, according to respective example embodiments.

FIG. 1 shows a simple client-server arrangement 100, in which a client application 102 assumes a secure local platform, and accordingly that the client application 102 itself does not disclose any data transmitted therefrom and that is destined for an server application 104. The client application 102 furthermore assumes and expects that data destined for the server application 104 is not disclosed by the server application 104 itself (e.g., the server application 104 is explicitly trusted).

Finally, the client application 102 authenticates the server application 104 to verify that a communication channel which is established to communicate data destined for the server application 104 is secure and that a destination alleging to be the server application 104 is in fact that application. The client application 102 authenticates the server application 104, for example, by matching a host name to an identity presented with a certificate. Identity authentication, in turn, is accomplished by the client application 102 trusting a certification authority (CA)) that vouches for a public-key certificate of the host name of the server application 104 (e.g., as may be implemented using Public Key Infrastructure (PKI)).

In the arrangement 100, the server application 104 does not expect or assume that the client application 102 keeps private data that the server application 104 sends to the client application 102. Accordingly, there is no trust of the client application 102 by the server application 104 that needs to be established in the arrangement 100. In an alternative embodiment, authentication of the client application 102 by the server application 104 may be implemented in order to establish trust, by the server application 104, regarding data destined for the client application 102 and sent by the server application 104.

Figure 2:
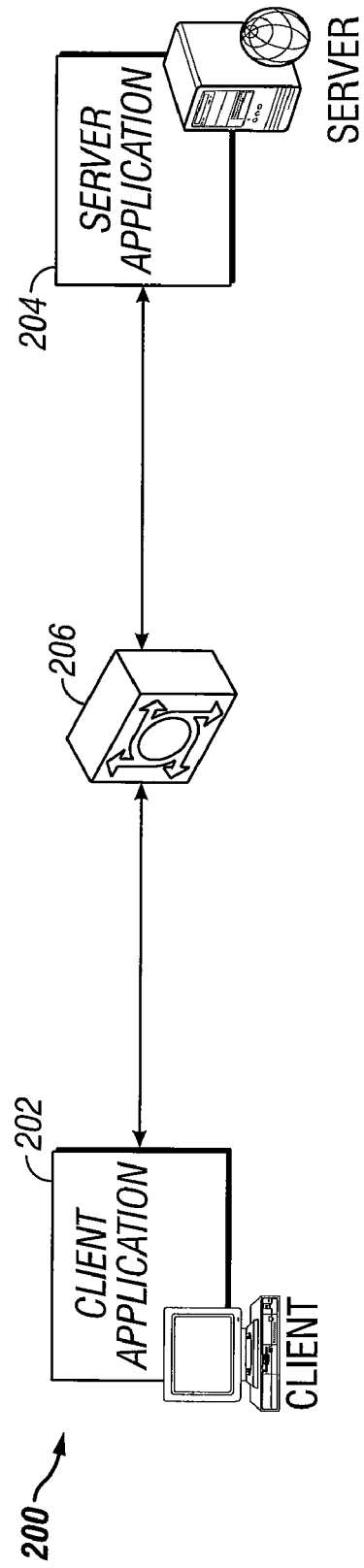

FIG. 2 illustrates a client-server arrangement 200 in which traffic between a client application 202 and a server application 204 is directed through one or more intermediaries 206. While, in the example embodiment shown in FIG. 2, a single intermediary 206 is illustrated, the intermediary 206 may be implemented as two entities that assume the role of an "intermediary" with respect to communications between the client application 202 and the server application 204.

Again, examining various trusts assumptions and expectations within the arrangement 200, the client application 202 assumes and expects that it does not disclose its own data, which is destined for the server application 204 (e.g., the assumption is made that the local platform of the client application 202 is secure).

The client application 202 furthermore expects that data destined for the server application 204 is not disclosed by the intermediary 206 (e.g., that an intermediary proxy is secured). The intermediary 206 assumes and expects that data destined for the server application 204 is not disclosed by the server application 204 itself. To this end, the intermediary 206 may expect that the server application 204 maintains security. The server application 204 is accordingly explicitly trusted by the intermediary 206. This explicit trust by the intermediary 206 of the server application 204 may be accomplished by the intermediary 206 authenticating the server application 204. This authentication may furthermore be accomplished by the intermediary 206 trusting a certification authority (CA) that vouches for a public-key certificate of the server application 204 (e.g., in terms of PKI). It should be noted that only the client application 202 can verify that the server application 204 is an intended data destination.

Further, the client application 202 authenticates the server application 204, through the intermediary 206. This is accomplished by the client application 202 matching an identity of the server application 204 to a host name of the server application 204, Identity authentication may be accomplished by any one of a number of methods, some examples of which are discussed below.

a. In a first example, using "authority sharing" of the server application 204 to the intermediary 206, the client application 202 may trust a certification authority (CA) that vouches for a public-key certificate of the server application 204, and may further trust the intermediary 206, which has been given a copy of a private key of the server application 204. The provision by the server application 204 of its private key may be used to implement the authority sharing of the server application 204 to the intermediary 206.

b. In a second example, using "server shadowing A", the client application 202 still trusts the certification authority (CA) that vouches for a public-key of a shadow server application (S'). The intermediary 206 is then given the private key for the shadow server application (S').

c. In a third example, using "server shadowing B", the client application 202 may trust a new certification authority (CA') that vouches for a public-key of a shadow server application (S'). The intermediary 206 is then given the private key for the shadow server application (S').

d. In a fourth example, termed "PKI shadowing", the client application 202 trusts a new certification authority (CA') that is controlled by the intermediary 206, and then vouches for a public-key certificate of a shadow server application (S'). The client application 202 trusts the intermediary 206 which has been given a copy of the private key of the shadow server application (S').

In order to establish trust in the arrangement 200, the intermediary 206 is required to have a certificate that matches, in matching operations performed by the client application 202, at least as well as the actual certificate issued by the server application 204. The matching may be performed as part of a selection process by the intermediary 206 that determines what certificate to use (if there is more than one possibility), rather than a match that "succeeds or fails." The matching of the certificate of the intermediary 206 with an actual certificate used by the server application 204 may be achieved in a number of ways, two of which are mentioned below. For example, the certificates may exhibit an exact match of common name (CN), or other identifying attributes. Alternatively, a "most specific" match of the common name (CN) or other identifying attribute of the certificate of the intermediary 206 to the certificate of the server application 204. For example, a portion of the common name of the intermediary's common name (e.g., *.b.com) may match a portion of the common name of the server application 204 (e.g., s.b.com).

The above operations may establish that the certificate of the server application 204 contains a common name, or other identifying attribute, that the client application 202 is able to successfully match.

The intermediary 206 may be one or more machines in a network. Considering for example the use of appliances, these appliances may need to be deployed within a restricted access environment to satisfy the expectation, with respect to the intermediary 206, that the "proxy is secure".

Figure 3:
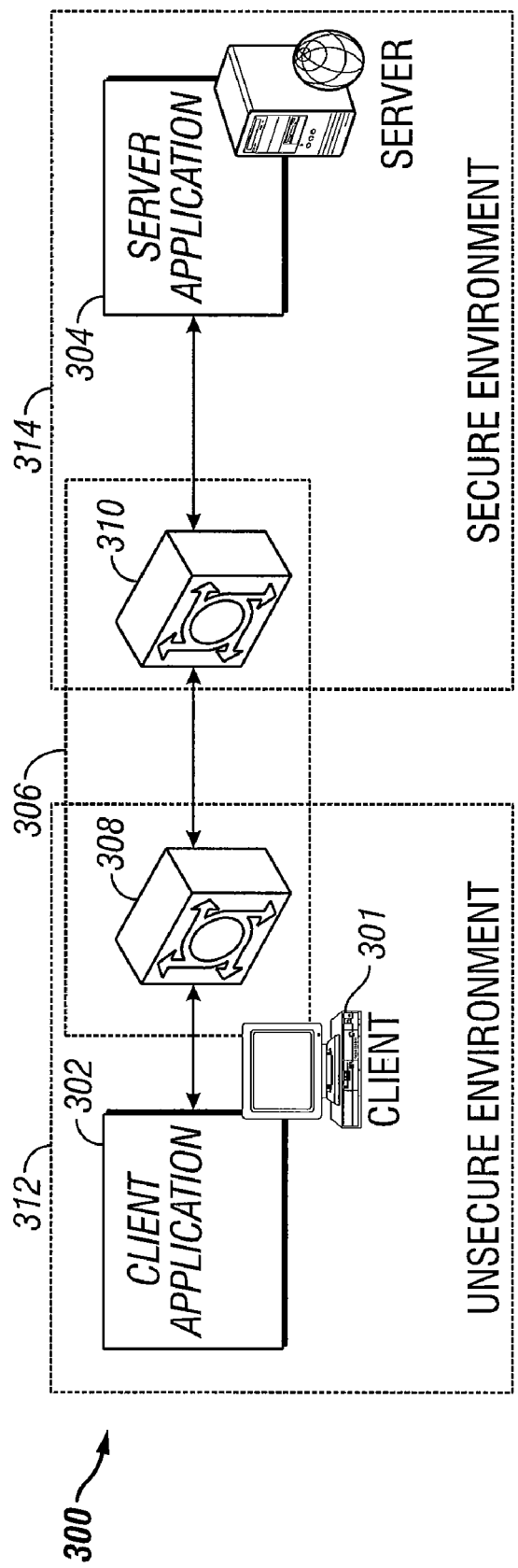

As noted above with reference to FIG. 2, the intermediary 206 may be one or more machines in a network. FIG. 3 is a diagrammatic representation of a client-server arrangement 300, in which an intermediary 306 is extended across two machines, namely an unsecure intermediary component 308 and secure intermediary component 310. Different custody properties may apply with respect to such distributed components. For example, the secure intermediary component 310 (e.g., an appliance and/or software component that runs on machine/appliance), by virtue of its placement within a network path, be under tight control of an administrator, and accordingly be regarded as operating within the confines of a secure environment 314. The unsecure intermediary component 308, (e.g., an appliance and/or software component that runs on machine/appliance) may be owned by a user other than the owner of the client application 302. FIG. 3 shows on example in which the unsecure intermediary component 308 is installed on the same client machine 301 as a client application 302 (e.g., a browser). As a result of the unsecure intermediary component 308 being inserted into the network path between the server application 304 and the client application 302, and not being under the custodial control of either an operator of the server application 304 or a user of the client application 302, the preservation of security and trust properties with respect to the unsecure intermediary component 308 may present a number of technical challenges.

Consider software running on a user-administered machine (e.g., machine 301) that also hosts the client application 302. For such software, data passing through the address base of the client machine 301 is not necessarily secure. Accordingly, the nearest choice of system, in a network-sense, that satisfies an expectation or assumption that data, of the client application 302, destined for the server application 304, is not disclosed, is the client machine 301 itself. This is based on the assumption that the "local platform is secure".

In one example embodiment, five trust assumptions and expectations may be applied within the arrangement 300. According to a first trust assumption, the client application 302 assumes and expects that it does not disclose its own data, which is destined for the server application 304 (e.g., the assumption is made that the local platform of the client application 302 is secure).

According to a second trust assumption, the client application 302 furthermore expects that its data, destined for the server application 304, is not disclosed by the secure intermediary component 310 (e.g., that the intermediary proxy 310 is secure).

The secure intermediary component 310, in turn, assumes and expects that data destined for the server application 304 is not disclosed by the server application 304 itself. To this end, the secure intermediary component 310 may expect that the server application 304 maintains security, and the server application 304 is implicitly trusted. This implicit trust by the secure intermediary component 310 of the server application 304 may be accomplished by the secure intermediary component 310 authenticating the server application 304. This authentication may in turn be accomplished by the secure intermediary component 310 trusting a certification authority (CA) that volunteers for a public-key certificate of the server application 304 (e.g., in terms of PKI).

The unsecure intermediary component 308 expects that data destined for the server application 304 is not disclosed by the secure intermediary component 310, on the assumption that the secure intermediary component 310 maintains its own security. This expectation may be supported by the unsecure intermediary component 308 authenticating the secure intermediary component 310. This in turn may be achieved by a number of exemplary methods, three of which are described below:

(a) In a first example, the intermediary component 308 trusts a certification authority (CA), which in turn vouches for a public-key certificate of the secure intermediary component 310 (e.g., in terms of PKI).
(b) In a second example, the unsecure intermediary component 308 trusts a self-signed certificate of the secure intermediary component 310.
(c) In a third example, the unsecure intermediary component 308 establishes an identity of the secure intermediary component 310 via some other mechanism, such as a shared secret between the intermediary components 308 and 310.

According to a third trust assumption, the unsecure intermediary component 308 is hosted on a machine that a user of the client application 302 trusts. This trust of a host may, for example, be necessary for a "proxy is secure" assumption, by a user of the client application 302, to hold. Trust, by a user of the client application 302, of a host of the unsecure intermediary component 308 may be achieved in a number of ways, and a number of example methods are now described.

In a first example, trust in the host of the unsecure intermediary component 308 may be established if the unsecure intermediary component 308 runs on a common system (e.g., the same machine) as the client application 302. A common host may be, in turn, be established in a number of ways. For example, the client application 302 may trust a Certificate Authority (CA") for which only the unsecure intermediary component 308 has the key, and no other client application trusts. An example embodiment of this common host trust method may conveniently be referred to as "PKI 1-to-1 unique local shadow".

A second method by which a common host may be verified and established is by assuming that the client application 302 trusts only the secure intermediary component 310 (e.g., as a result of the secure intermediary component 310 being within the secure environment 314), and the secure intermediary component 310 establishes both the client application 302 and the unsecure intermediary component 308 are on a common host. The secure intermediary component 310 may, in turn, establish that both the client application 302 and the unsecure intermediary component 308 are hosted on the same host by (1) authenticating the unsecure intermediary component 308, (2) authenticating the client application 302, and (3) verifying that the intermediary component 308 and the client application 302 correspond to the same host.

Authentication by the secure intermediary component 310 of the client application 302 may be accomplished by any number of methods, including a first method in which the unsecure intermediary component 308 trusts a self-signed certificate of the client application 302, or by the unsecure intermediary component 308 trusting a certification authority (CA) that vouches for a public-key certificate of the client application 302, and expects exactly a certificate of the client application 302 (e.g., client identity PKI).

According to a fourth trust assumption, the client application 302 authenticates the server application 304 through the unsecure intermediary component 308. This authentication may be accomplished by having the client application 302 match an identity of the server application 304 to the server's hostname.

Server identity verification can, in turn, be achieved in a number of ways, some examples of which are provided below:

(a) The client application 302 may trust a certificate authority (CA'), which the unsecure intermediary component 308 controls and that vouches for the shadow public-key certificate of a server application (S') shadow server (S'). The certificate authority (CA) needs to be unique across intermediary components operating in unsecure environment (e.g., such as the unsecure intermediary component 308). This method of identity matching may conveniently, in an example embodiment, be referred to as "PKI 1-to-1 unique local shadowing." The unique CA may imply distinct public and private keys.

(b) The client application 302 may trust a certificate authority (CA) that vouches for a public-key certificate of a shadow server (S'), and the secure intermediary component 310 has a copy of a private key for the shadow server (S'). This method of identity matching may, in an example embodiment, conveniently be referred to as "server shadowing A."

(c) In a third example, using "server shadowing B", the client application 302 may trust a new certification authority (CA') that vouches for a public-key of a shadow server application (S'). The intermediary 306 is then given the private key for the shadow server application (S').

(d) The client application 302 may trust a certificate authority (CA) that vouches for a public-certificate of the server application 304, and the secure intermediary component 310 may be provided with a copy of the private key of the server application 304. The secure intermediary component 310 may, in this example method, transfer a session key to the unsecure intermediary component 308, as is described in further detail below with reference to FIG. 4. An example embodiment of this method may conveniently be referred to as "authority sharing of a server application with a secure intermediary component, operating within a secure environment."

An example fifth trust assumption within the arrangement 300 may involve the unsecure intermediary component 308 generating a certificate that matches (at least as well as) an actual certificate used by the server application 304.

This "at least as well" matching may, for example, be recognized where there is either an exact match of a common name (CN) (or other identifying attribute) of a certificate of the unsecure intermediary component 308 to a certificate of the server application 304, or where there is a "most specific" match of a common name (CN) (or other identifying attribute) of a certificate of the unsecure intermediary component 308 to a certificate of the server application 304. For example, a "*.b.com" of a certificate of the unsecure intermediary component 308 may match "s.b.com" of a certificate of the server application 304.

Having above described a progression of trust relationships through the arrangements 100, 200 to 300, further details regarding an exemplary implementation of establishing trust within a specific example of the arrangement 300, where the intermediary comprises both secure or unsecure components, is described in further detail below.

Example embodiments, described in further detail below, propose methods and systems that enable an intermediary component, in the example form of a network traffic processor, to issue and export its own certificates to cryptographically-enabled applications (e.g., SSL applications, such as a browser) that are hosted on a common computer system, thus establishing a trust between the network traffic processor (e.g., a network traffic acceleration application) and the cryptographically-enabled application. The certificates may be issued by a local certification authority (CA) that applications explicitly trust to perform various functions, such as optimizing network traffic originating from the application. In an example embodiment, SSL sessions may be terminated by a network traffic processor that will present server certificates signed by a local certification authority (CA).

A network traffic processor, according to an example embodiment, may be employed on computer systems operating in an unsecure or untrusted environment. For example, mobile or out-of-office users who have computer systems (e.g., laptops, desktops and mobile devices) outside the direct control of a network administrator may have control over their operating systems, applications, and therefore their application's data. Within the context of the arrangement 300, shown in FIG. 3, such a network traffic processor would be an example of an unsecure intermediary component 308 operating within an unsecure environment 312.

An example embodiment provides a method and system to determine that a local network traffic processor (e.g., a network traffic accelerator) is on a host that is trusted by a user of a client application. In an example embodiment, this may include a determination that a client application (e.g., an Internet browser) and the network traffic processor are resident on a common computer system (e.g., a mobile untrusted system). Based on this determination, the local application may be configured to enforce a specific security protocol. For example, a local application (e.g., a browser) may be configured to explicitly trust a server certificate of the local network traffic processor (e.g., traffic accelerator). The local network traffic processor (as an example of an unsecure intermediary component) is operatively paired with a remote network traffic processor (as an example of a secure intermediary component) to perform certain network traffic processing operations (e.g., network traffic optimization and acceleration).

A proxy server certificate is generated using information extracted from an original server certificate (e.g., a server common name (and/or other server identifier) of a server associated with the remote network traffic processor and signed by the local certification authority. The information extracted from the original server certificate may also include various extensions, such as alternative names of the server. The proxy server certificate is used to establish a secure session or connection between the local network traffic processor and the application.

A local application, such as a browser, may be configured to accept the proxy server certificate. Such configuration may include the addition of trust to the local certification authority (CA). The configuring of trust may in turn include the addition of the local certification authority's (CA) certificate to the trusted certificate store of the browser and may be done during installation of the local network traffic processor on the local computer system.

Proxy server certificate generation may include generating a private/public key pair for the local network traffic processor, and providing the public key to the local certification authority. The proxy server certificate is presented to the local application (e.g., the browser) during secure connection establishment, while the CA certificate is used when configuring the local application's trusted certificate store. CA's certificate and key pair are used to issue proxy server certificates.

The method and system may further receive, from the remote traffic server processor, an original server certificate that includes the server common name or other server identification information. The proxy server certificate may be issued by a remote network traffic accelerator.

In one embodiment, the local certification authority (CA) may be integrated within and form part of the local network traffic processor.

A further method and system, according to an example embodiment, may include receiving, at a server-side network traffic processing application, a request to establish a secure connection with a client-side network traffic processing application. The server-side network traffic processing application may then determine that the client-side network traffic processing application is within an unsecure environment. Based on this determination, the server-side network traffic processing application may choose to enforce a security protocol that is the most appropriate for the conditions. For example, traffic processing applications operating in the unsecure environment would be subject to a more stringent protocol. Examples of such a more stringent protocol are described in detail herein. In one embodiment, a more "stringent" protocol may be regarded as a protocol that is more secure than a less stringent one. A more secure protocol may in turn incorporated fewer expectations and assumptions regarding trust between entities, and accordingly implement more rigorous verification and authentication operations between communicating entities.

The server-side network traffic processing application may alternatively determine that the client-side network traffic processing application is within a secure environment. Based on this determination, the server-side network traffic processing application may selectively implement a less restrictive protocol to securely connect with client-side network traffic processing application. This may include migrating a symmetric session key for a secure connection from the server-side network traffic processing application to the client-side network traffic processing application.

Figure 4:
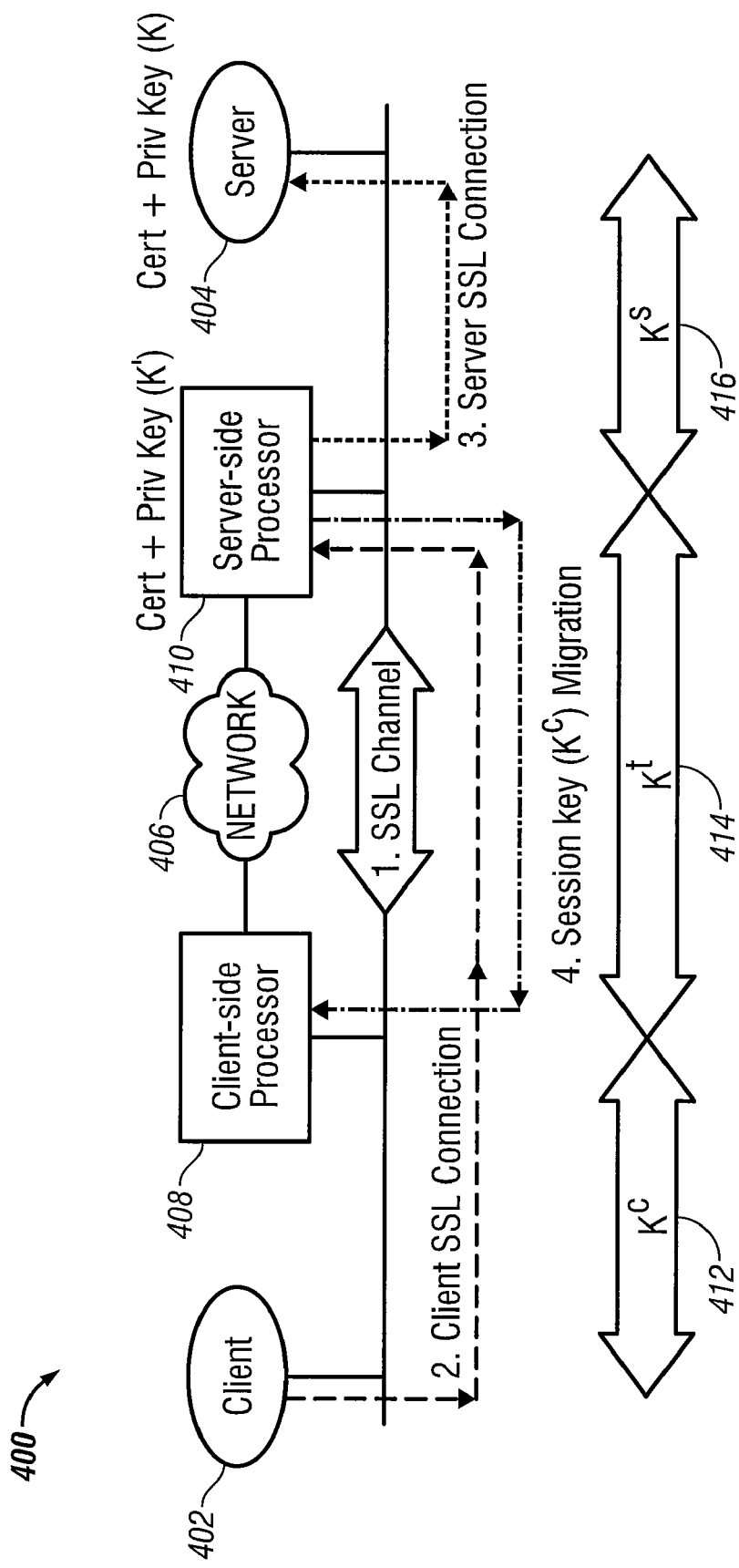
FIG. 4 is a block diagram illustrating a system to process network traffic, and in conjunction with which example embodiments may be deployed.

FIG. 4 is a block diagram illustrating a system 400, to process (e.g., accelerate, optimize, snoop, etc.) network traffic, in conjunction with which example embodiments may be deployed. While the example system 400 is described as supporting a client-server architecture, it will be appreciated that in another embodiment, a distributed or peer-to-peer system may similarly be supported.

A client application 402 communicates with the server application 404 across a network 406 (e.g., a wide-area network (WAN)) via paired network traffic processors. In an example embodiment, a client-side network traffic processor 408 and a server-side network traffic processor 410 may be a client-side network traffic accelerator and a server-side network traffic accelerator, respectively. The client-side network traffic processor 408 and the server-side network traffic processor 410 may be dedicated computer systems or appliances, or may alternatively be applications executing on common computer systems with the client application 402 or the server application 404, respectively. Where the client-side network traffic processor 408 is a dedicated appliance, the client-side network traffic processor 408 may be connected with multiple client applications 402 via a variety of links, local area networks (LANs) and communication components that may include routers, switches, firewalls and other network devices. Similarly, where the server-side network traffic processor 410 is a dedicated appliance, such a device may be connected via a WAN (not shown), and/or any number of networks, routers, gateways, firewalls or other network devices to one or more servers 404. Furthermore, the association of one or more client applications 402 with client-side processor 408, and the association of one or more servers 404 with server-side processors 410, may be based on a physical arrangement of network connections or network characteristics such as bandwidth and latency. For example, one of a set of processors may be associated with a particular client or server based on network bandwidth or latency between them.

Each of the processors 408 and 410 may be considered to communicate via associated outer and inner channels. Specifically, a client-side network traffic processor outer channel 412 may be established, as will be described in further detail below, between the client application 402 and the client-side processor 408; a processor-to-processor inner connection or channel 414 may be established between client-side and server-side processors 408 and 410; and a server-side processor outer connection or outer channel 416 may be established between a server-side processor 410 and a server application 404. The existence and nature of the inner connection or channel 414 is typically hidden from the client application 402 and the server application 404. The client-side and server-side network traffic processors 408 and 410 may operate and maintain the outer channels or connections 412 and 416 so that interactions or transactions between a client application 402 and a server application 404 are substantially similar to interactions in the absence of the client-side and server-side network traffic processors 408 and 410.

Because the existence of the inner channel 414 is transparent to a client application 402 and a server application 404, a variety of network traffic optimization and security measures may be implemented on the inner channel 414 to improve quality, performance, and reliability of communications between a client application 402 and a server application 404, for example. To this end, the client-side and server-side network traffic processors 408 and 410 divert some or all of the network traffic between a client application 402 and server application 404 over the inner channel 414 for the given optimized connections. Optimized network traffic, for example received by the server-side processor 410, may then be de-optimized so as to be identical to, or an acceptable substitute for, network traffic that was originally sent from the client application 402. This de-optimized network traffic is then sent on to the server application 404. Likewise, network traffic received from the server application 404 at the server-side network traffic processor 410 may be optimized for passage across the inner channel 414. This optimized network traffic may then be received by the client-side processor 408, and be de-optimized so as to be identical to, or an acceptable substitute for, the network traffic that was originally sent from the server application 404. The de-optimized network traffic may then be sent via the outer channel 412 from the client-side processor 408 to the client application 402.

The establishment of the outer channel 412, 416 and inner channel 414 may be achieved in a number of different ways. In one example embodiment, the mechanism by which these connections are established may be dependent upon whether the client-side processor 408 is operating within a secure or trusted environment. Consider, for example, where the client-side network traffic processor 408 resides on a dedicated appliance that is under the control of a network administrator (e.g., at a remote office of an organization). In this case, a network administrator may be willing to accept decryption of SSL network traffic, at the client-side network traffic processor 408, that is being communicated to and from a client application 402 hosted on a machine other than the dedicated appliance in which the client-side network traffic processor 408 is executing. Here, the network administrator has control of the environment in which the network traffic is decrypted and exposed, and accordingly security concerns may be lessened in such an environment.

On the other hand, where the client-side network traffic processor 408 is operating within an unsecure (e.g., unprotected, unknown or untrusted) environment, security vulnerabilities may arise where the client-side network traffic processor 408 operates to decrypt SSL network traffic, for example, with respect to a client application 402 executing on a machine other than a machine on which the client-side network traffic processor 408 is hosted. Further details regarding example security vulnerabilities in this scenario are described below.

According to an example embodiment, the manner in which the various outer and inner channels 412, 414 and 416 are established may be contingent upon a determination by a server-side processor 410 whether a client-side processor 408 (with which it is being paired or peered) is operating in a secure or trusted environment.

FIG. 4 illustrates an example procedure for establishing the secure channels 412, 414 and 416, where the client-side network traffic processor 408 is deemed to be operating within a relatively secure or trusted environment (e.g., where the client-side network traffic processor 408 is a client-side network traffic accelerator operating as a standalone and dedicated device or appliance at a location controlled by a network administrator). In order to process (e.g., optimize or snoop) network traffic, both the client-side network traffic processor 408 and the server-side network traffic processor 410 need to be able to decrypt SSL traffic. This may be achieved by allowing a client application 402 to negotiate an SSL connection with the server-side processor 410, and then migrating the connection session key from the server-side network traffic processor 410 to the client-side network traffic processor 408.

An example connection set up process for the channels 412, 414 and 416, is described with reference to FIG. 4. Initially, the client-side network traffic processor 408 and the server-side network traffic processor 410 intercept an SSL connection, and establish normal, unencrypted inner and outer TCP connections between the client application 402 and client-side network traffic processor 408, between the client-side network traffic processor 408 and server-side network traffic processor 410, and between the server-side network traffic processor 410 and the server application 404. The client application 402 may then send an SSL ClientHello message, which triggers the client-side network traffic processor 408 and the server-side network traffic processor 410 to perform an SSL handshake on their inner connection to generate a secure SSL channel 414 with the session key $K^t$. The client-side network traffic processor 408 then forwards the original ClientHello message to the server-side network traffic processor 410, which performs an SSL handshake with the server application 404, to establish an outer channel 416 that uses the session key $K^s$.

After the SSL handshake between the server-side network traffic processor 410 and the server application 404 is complete, the server-side network traffic processor 410 proceeds with the client application's handshake. The process establishes a secured channel 412 with the session key $K^c$, between the client application 402 and the server-side network traffic processor 410.

Following the completion of the SSL handshake between the server-side network traffic processor 410 and the client application 402, the server-side network traffic processor 410 then migrates the session key $K^c$ to the client-side network traffic processor 408, so that the client-side network traffic processor 408 can decrypt/encrypt network traffic received from, and transmitted to, the client application 402.

Figure 5:
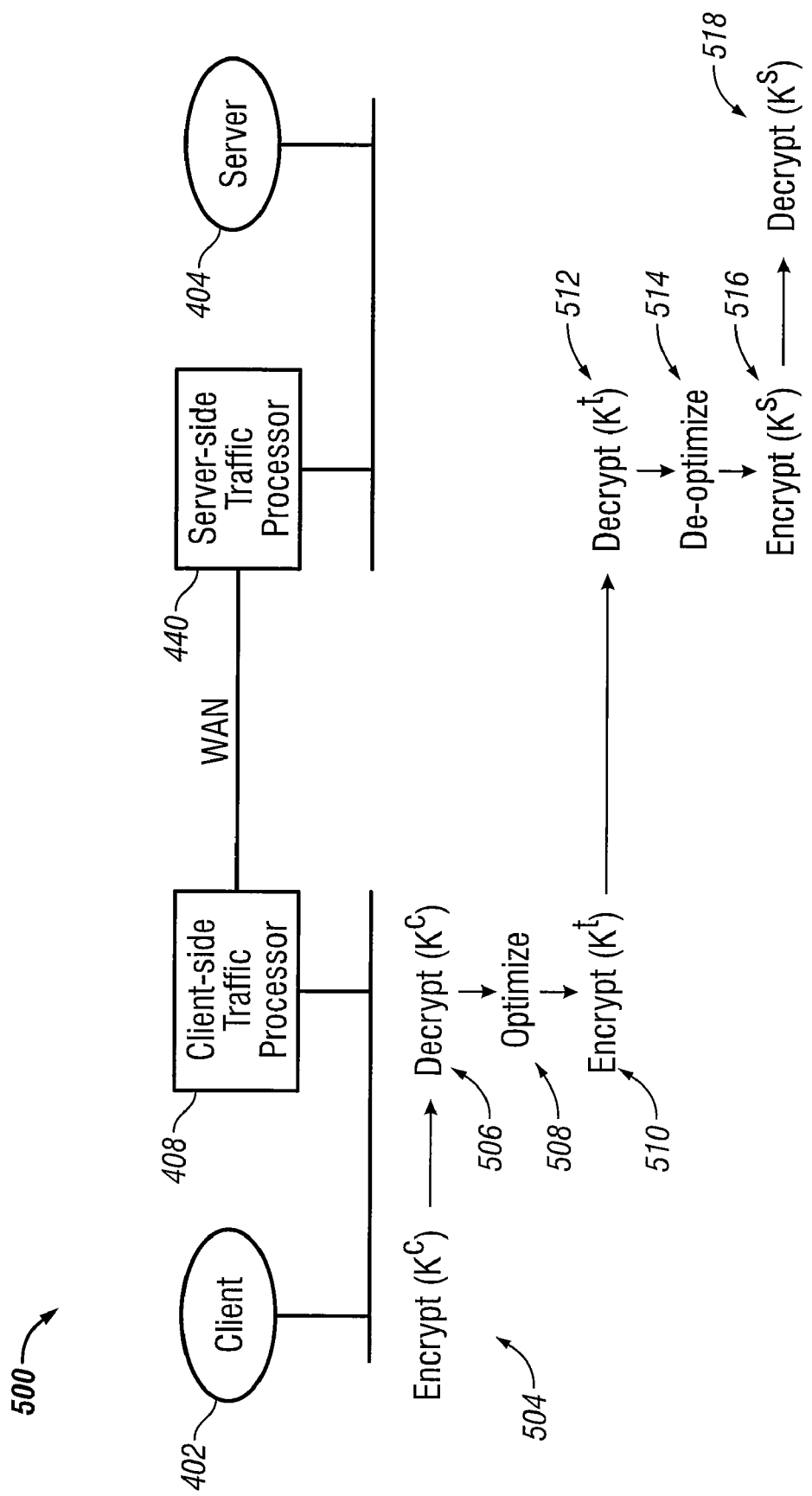
FIG. 5 is a block diagram illustrating a process, according to an example embodiment, by which a network traffic transmitted from a client application to a server application may be optimized, according to an example embodiment.

FIG. 5 is a block diagram illustrating a process 500, according to an example embodiment, by which network traffic transmitted from the client application 402 to the server application 404 may be optimized. At operation 504, the client application 402 encrypts data to be transmitted using the session key $K^c$, and transmits it over the outer channel (not shown). The client-side processor 408, operating in this example embodiment as a traffic accelerator, decrypts this traffic at operation 506 using the session key $K^c$, previously provided by the server-side processor 410. The client-side network traffic processor 408 may then, at operation 508, optimize the network traffic (or in other embodiments, perform other processing or operations with respect to the network traffic), and then re-encrypt the network traffic using the session key $K^t$ for transmission over the inner channel 414 (not shown), at operation 510.

Figure 6:
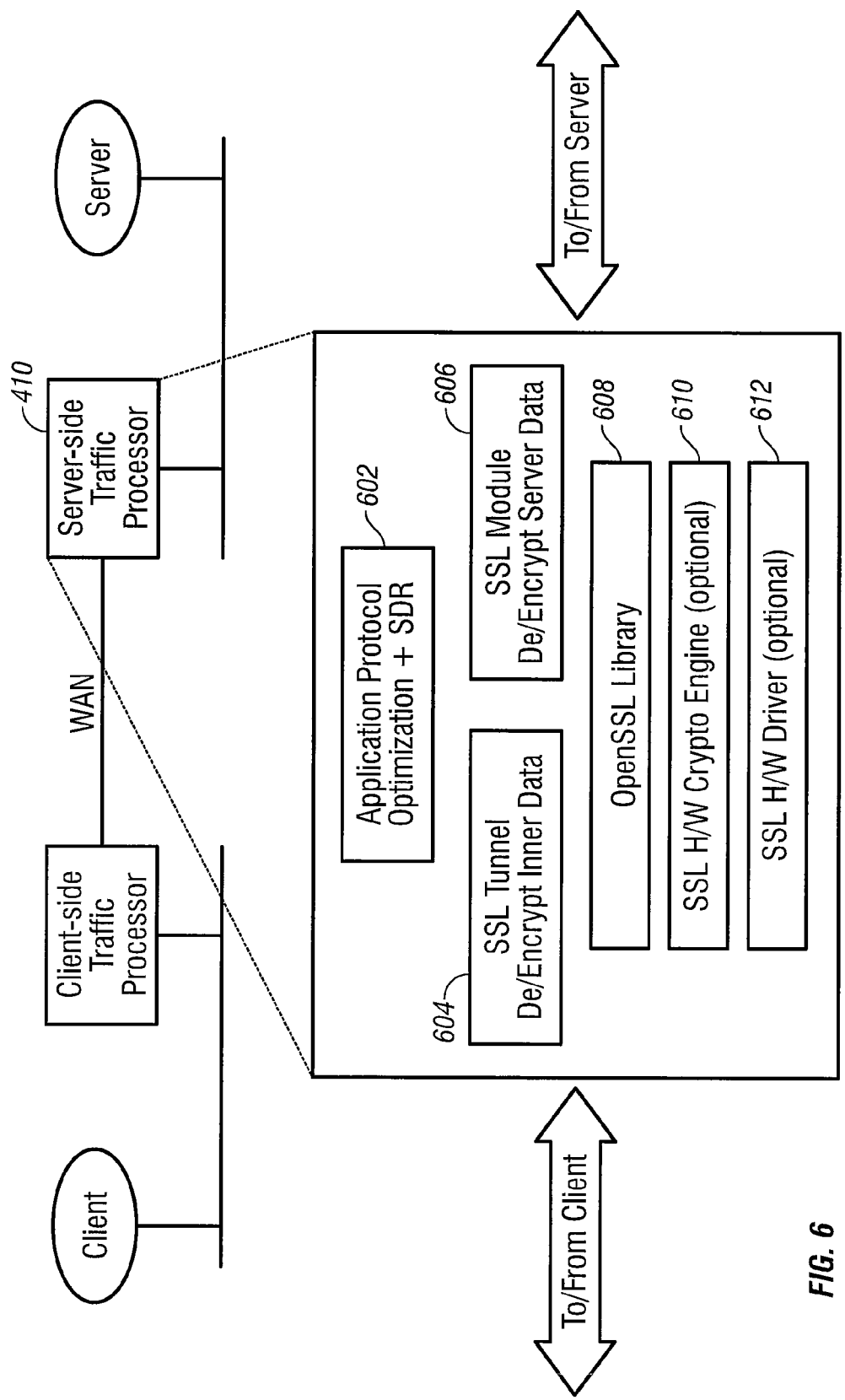
FIG. 6 is a block diagram illustrating details of an architecture of a server-side processor, according to an example embodiment.

At operation 512, the server-side processor 410 receives the network traffic over the inner channel (not shown), decrypts the network traffic using the session key $K^t$, de-optimizes the network traffic at operation 514, and then re-encrypts the network traffic at operation 516 for transmission over the outer channel 416 (not shown) to the server application 404. The server application 404, decrypts the network traffic using the session key $K^s$ at operation 518, upon receiving it from the server-side processor 410, FIG. 6 is a block diagram illustrating further details regarding an example architecture of a server-side processor, in the example form of a server-side network traffic accelerator 410. The server-side network traffic accelerator 410 is shown to include an application protocol optimization module 602, SSL channel decrypt/encrypt inner data module 604, and SSL module decrypt/encrypt server data module 606. The server-side network traffic accelerator 410 may further include an OpenSSL library 608, an optional SSL hardware crypto engine 610 and an optional SSL hardware driver 612.

Figure 7:
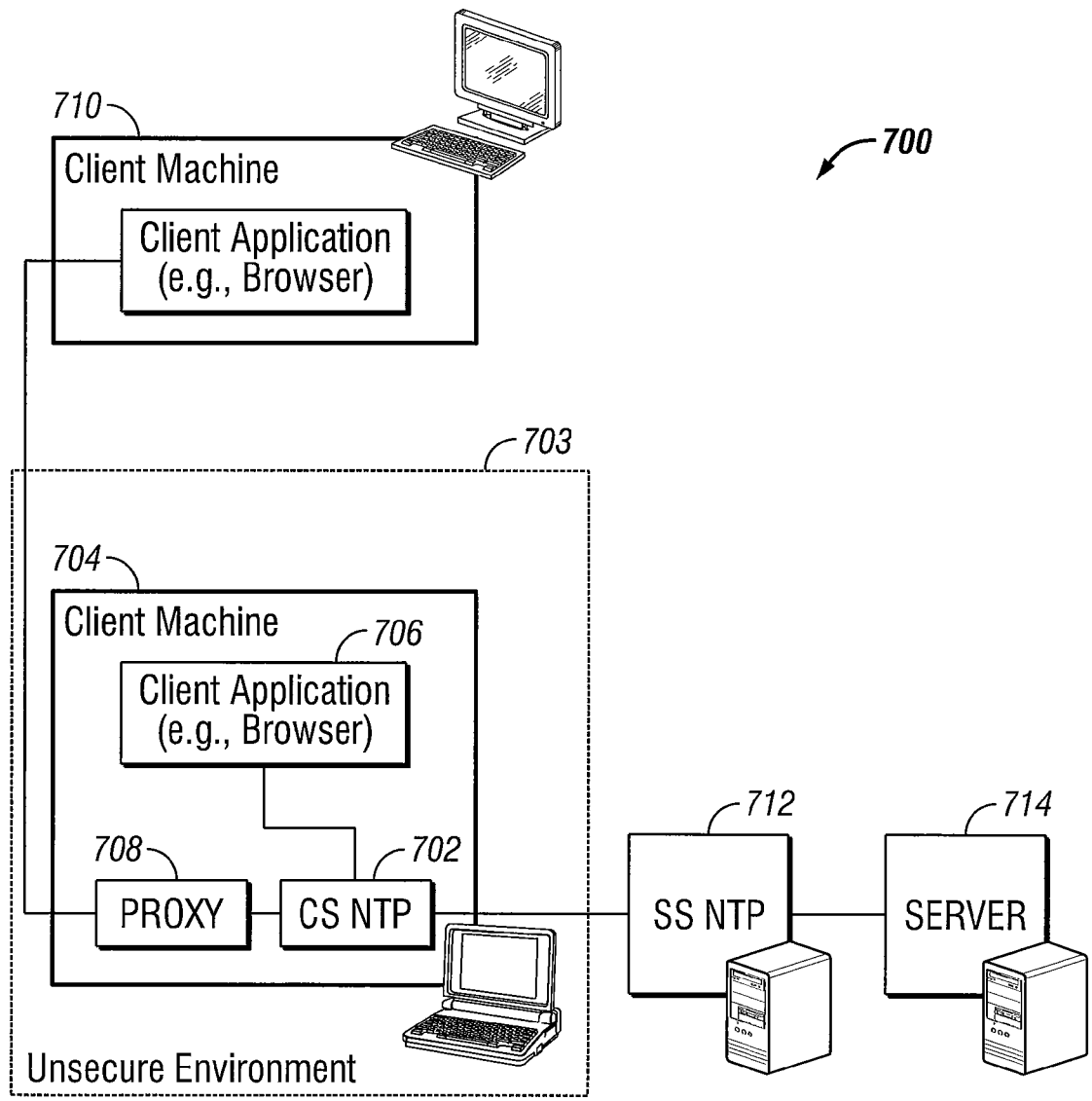
FIG. 7 is a diagrammatic representation of a network traffic processing system, according to an example embodiment.

FIG. 7 is a diagrammatic representation of a network traffic processing system 700 in which a client-side network traffic processor (CS NTP) 702 is installed on a client machine 704 (e.g., a user laptop) that operates in an unsecured or untrusted environment 703, and could potentially be used to perform a "man-in-the-middle" attack. The client machine 704 is also shown to host an application 706, in the example form of an Internet browser, and a proxy application 708 that allows a further client machine 710 to be redirected or proxied through a network connection of the client machine 704. Traffic originating from such proxy application would be deemed local and hence optimized by the client-side network traffic processor 702.

A server-side network traffic processor (SS NTP) 712 is shown to be paired with the client-side network traffic processor 702 that, in the example embodiment, together operate to optimize and/or accelerate network traffic between the application 706 and server 714.

It will be appreciated that the existence of the proxy application 708 on the client machine 704 raises certain security issues that would not apply where the client-side network traffic processor (CS NTP) 702 is a dedicated application running on a dedicated appliance platform maintained, for example, within a secured and trusted environment that is under the control of a network administrator. In the example embodiments discussed with reference to FIGS. 4 and 5, it is presumed that the client-side network traffic processor 408 is installed in a secured location, and access is restricted to authorize users. However, in the scenario illustrated in FIG. 7, the client-side network traffic processor 702 is installed on an end-user's actual system. As such, it may be possible for a malicious user (or attacker) to obtain access to traffic that originates from another client machine 710 and redirect it to a proxy application 708 installed on the client machine 704 This proxy application 708 would then forward traffic to an original destination server. The traffic would then be decrypted and optimized by the CS NTP 702 on behalf of the unsuspecting user of the other machine 710. Because the client-side network traffic processor 702 decrypts and optimizes SSL traffic, the owner of the client machine 707 may be able to view any SSL traffic between the client machine 710 and the server 714.

An example attack may occur where a legitimate employee of an organization with a client-side network traffic processor 702 installed on their laptop enables Internet sharing on their laptop. Should such a legitimate employee be able to insert their laptop in-path in a network (e.g., by simply reconnecting the Ethernet jack on their laptop in a neighbor's office or reconfiguring a switch, or installing a new switch), the employee would then be able to decrypt any SSL traffic destined to a known internal (i.e. pre-configured) server.

In order to address security concerns where the client-side network traffic processor 702 is installed on a machine operating in a unsecured or untrusted environment, an example embodiment proposes restricting the client-side network traffic processor 702 to only optimize connections initiated by local applications (e.g., the client application 706) on a common computer system (e.g., a local system). and thus preventing from processing connections that are initiated from an external system (e.g., the client machine 710). Accordingly, in the above example, the client machine 704 of an attacker may be enabled to optimize, or otherwise process, network traffic over connections from the client application 706, but is not over connections from the proxy application 708.

According to one example embodiment, unique data may be generated, per client-side network traffic processor installation, and shared between the client-side network traffic processor and an application (e.g., a browser). This unique data facilitates a check whether both the client-side network traffic processor and the application are running on a common computer system. In the example embodiment, a "man-in-the-middle" vulnerability, as described above, may be thwarted by configuring an application (e.g., a browser) to trust a local, client-side network traffic processor installation. In one embodiment, this may be achieved by creating a local certification authority (CA), unique to and associated with a local client-side network traffic processor. The local CA signs server proxy certificates presented to the application. Accordingly, the check as to whether the application and the local client-side network traffic processor are running on the same machine is pushed on to the application, as the application validates the identity of a server against an internally maintained trust list anyway, as is described in further detail herein.

Figure 8:
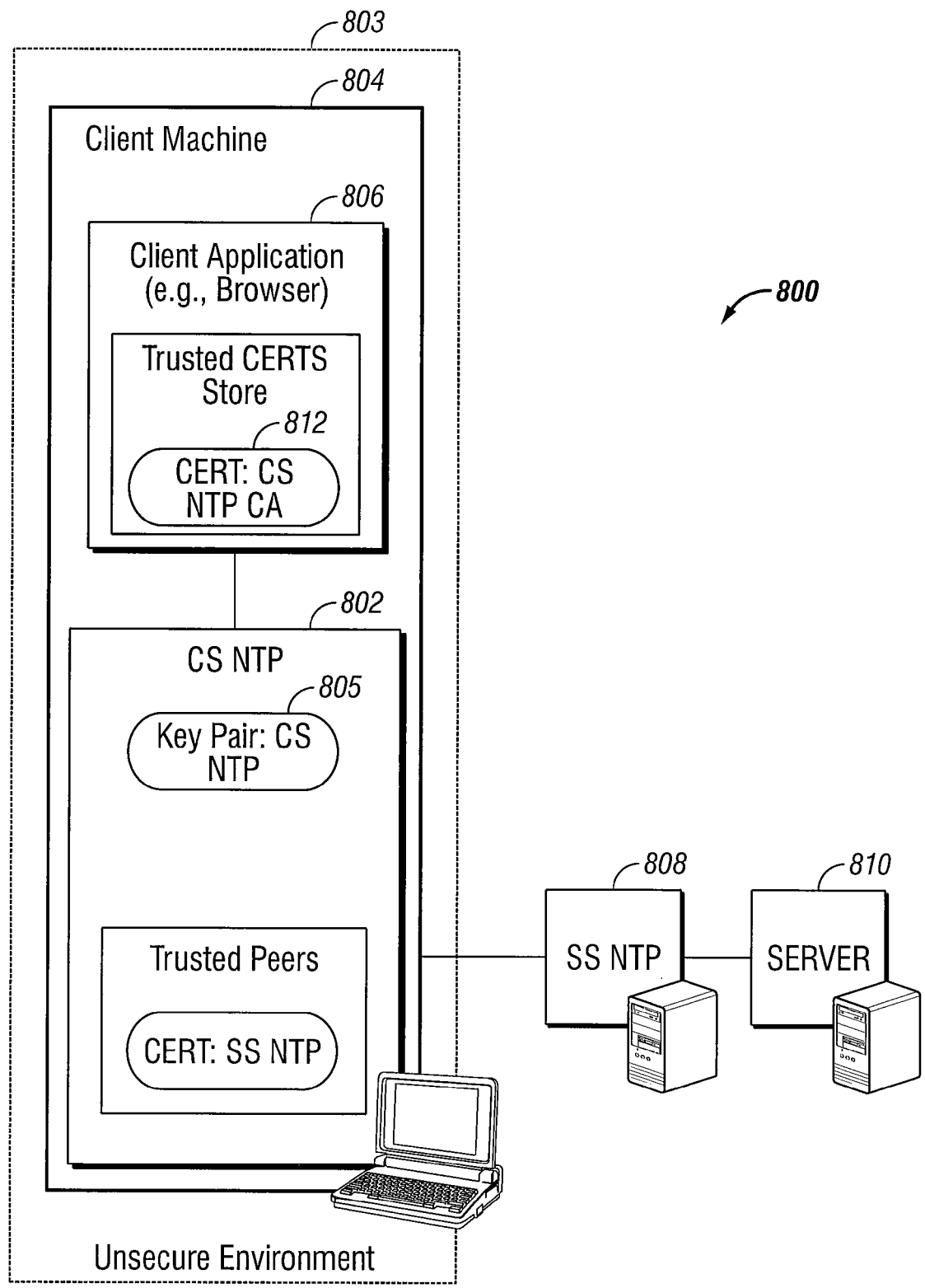
FIG. 8 is a diagrammatic representation of a system, according to an example embodiment, to process network traffic in a secured manner, where a client-side network traffic processor is installed on a client machine operating within an unsecure environment.

FIG. 8 is a diagrammatic representation of a system 800 to process network traffic in a secured manner where a client-side network traffic processor (CS NTP) 802 is installed on a client machine 804 operating within an unsecured and/or untrusted environment 803. An application 806, in the example form of an Internet browser, is also hosted on the client machine 804. The local client-side network traffic processor 802 is paired with a server-side network traffic processor (SS NTP) 808, which is in turn connected (e.g., by a secured outer channel) to one or more servers 810. The operation of the system 800 is discussed below with reference to FIGS. 9-15.

Figure 9:
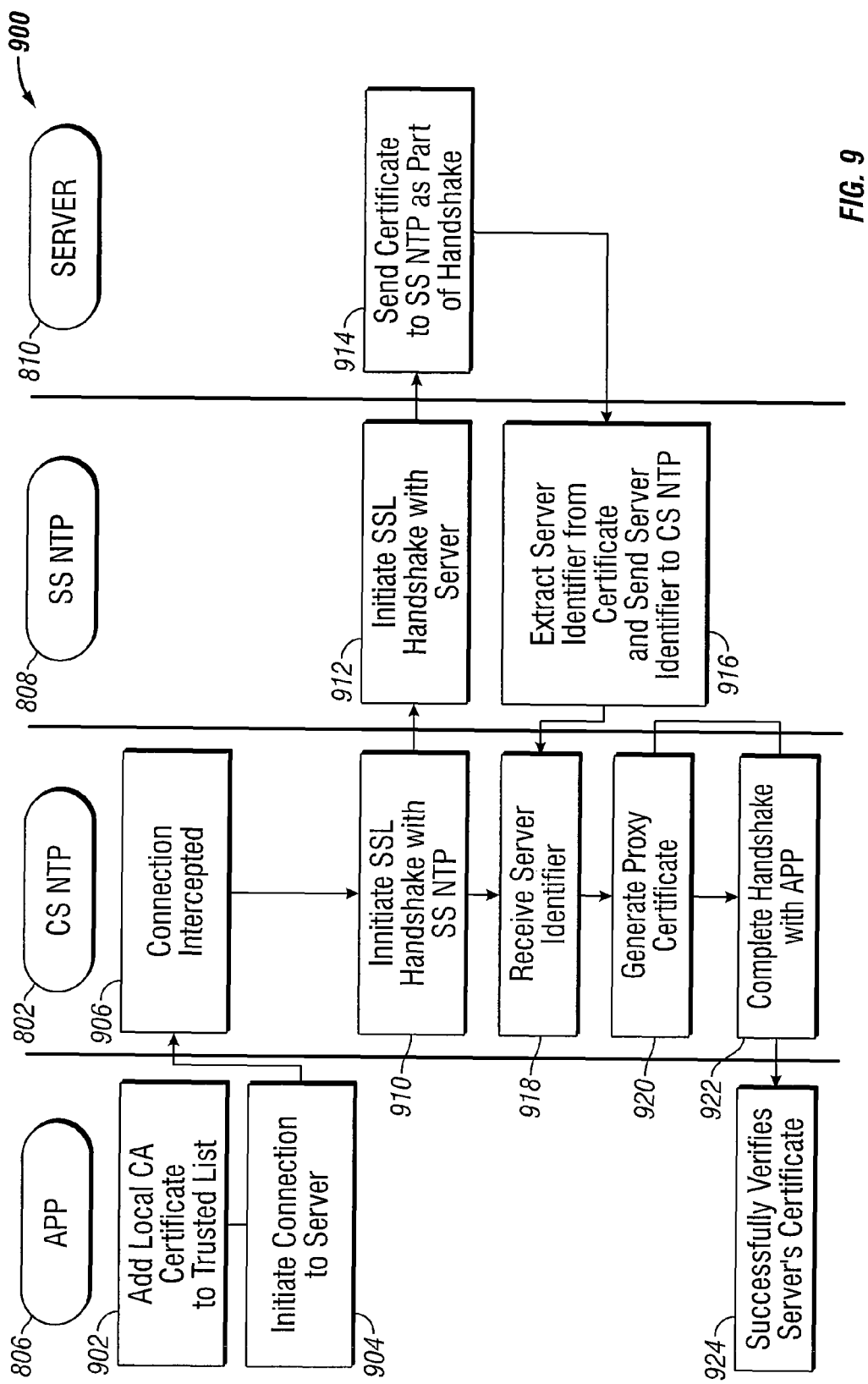
FIG. 9 is a swim lane flowchart illustrating a method, according to an example embodiment, to establish a secure session or connection between a local network traffic processor and an applications operating within an unsecure environment.
Figure 10:
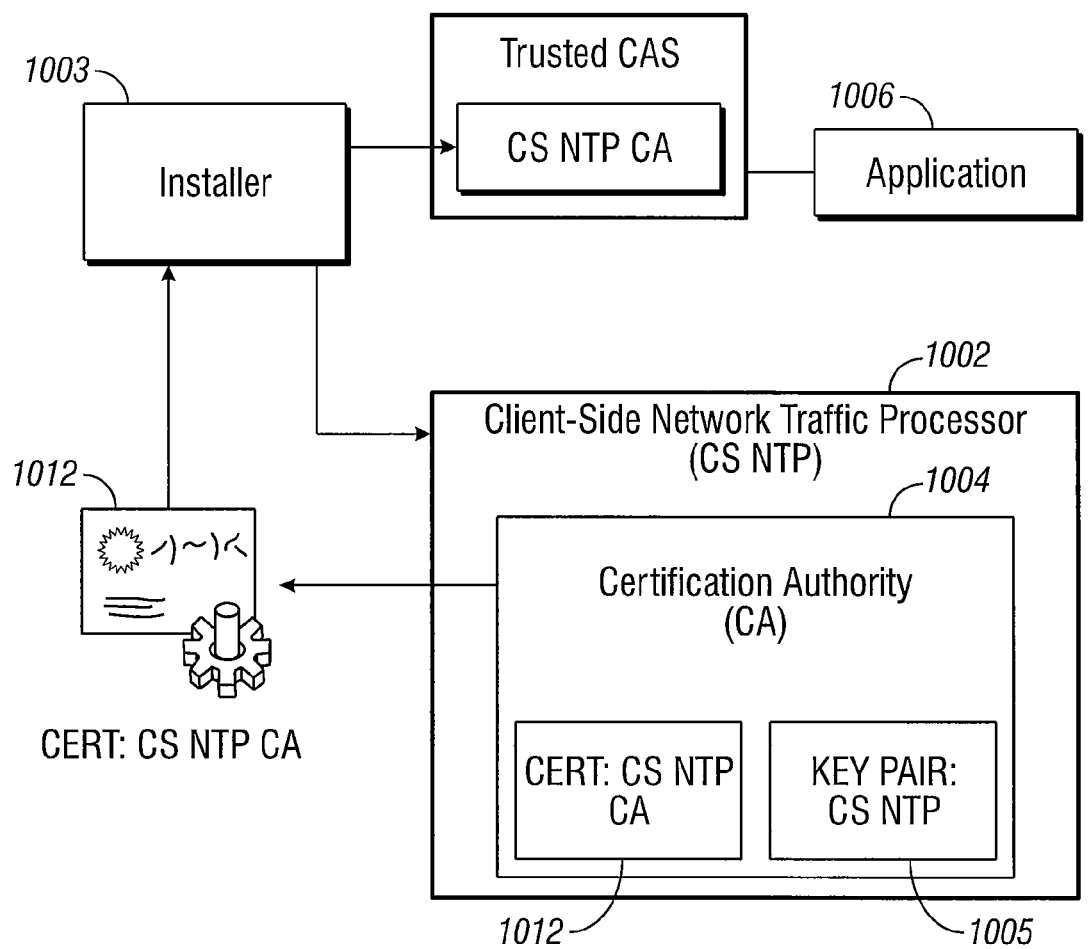
FIGS. 10 and 11 are block diagrams illustrating architectural details of a client-side network traffic processor and a server-side network traffic processor, according to an example embodiment.
Figure 11:
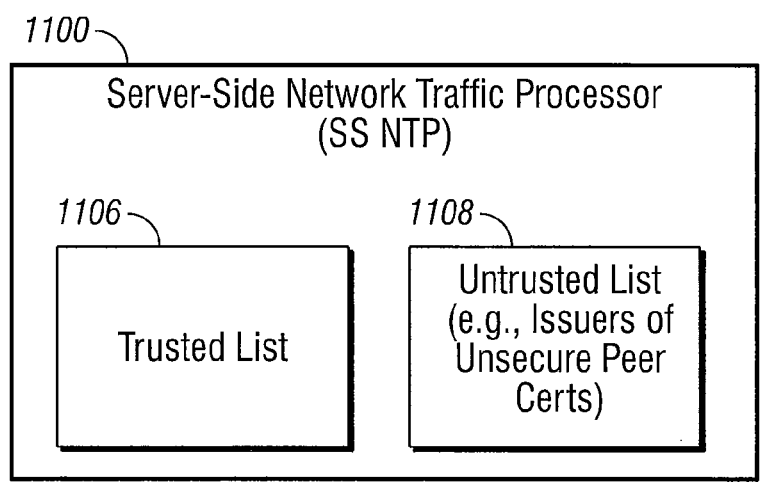
Figure 12:
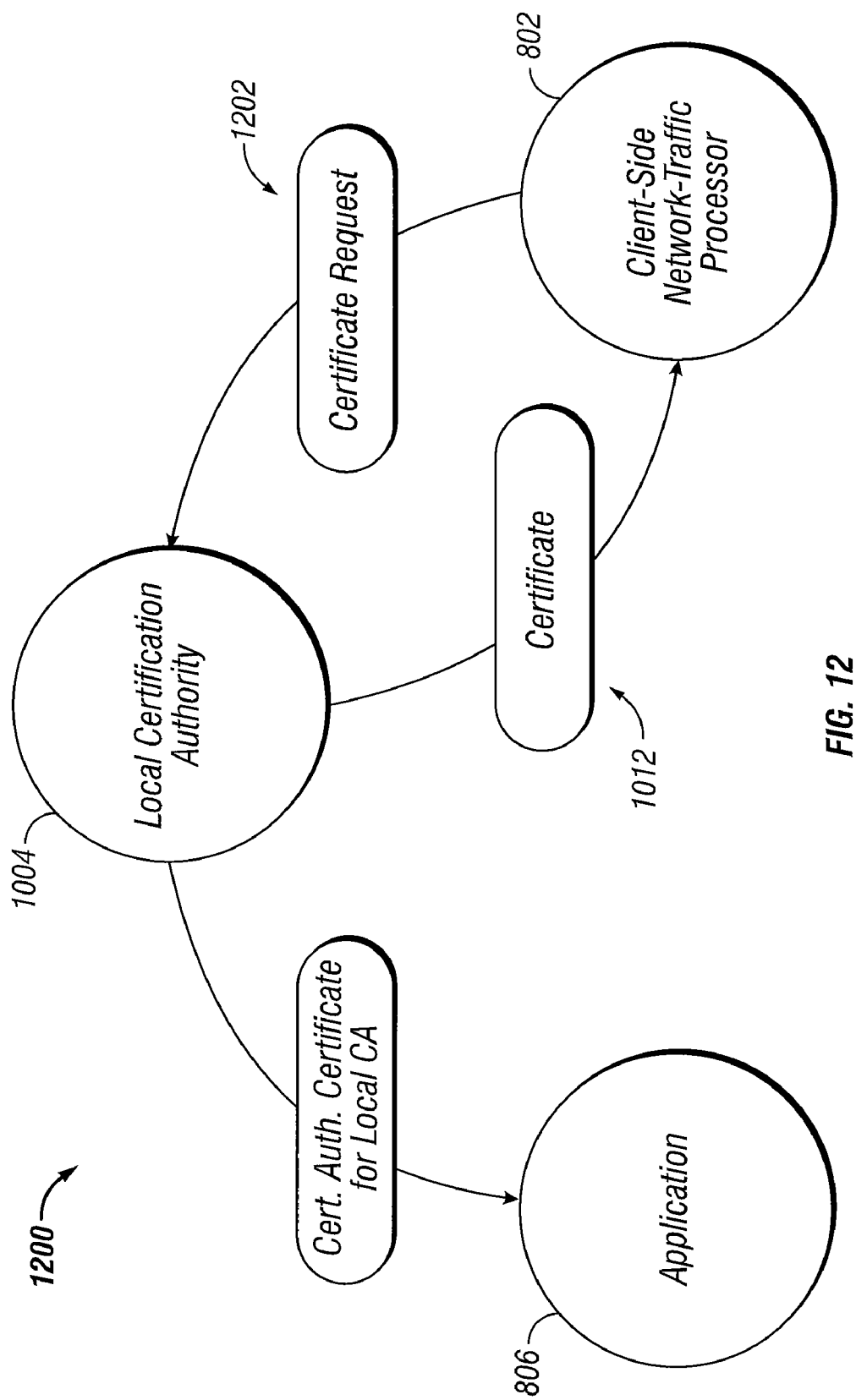
FIG. 12 is a diagram illustrating a method, according to an example embodiment, whereby a local certification authority may issue a certificate to a local network traffic processor, according to an example embodiment.
Figure 15:
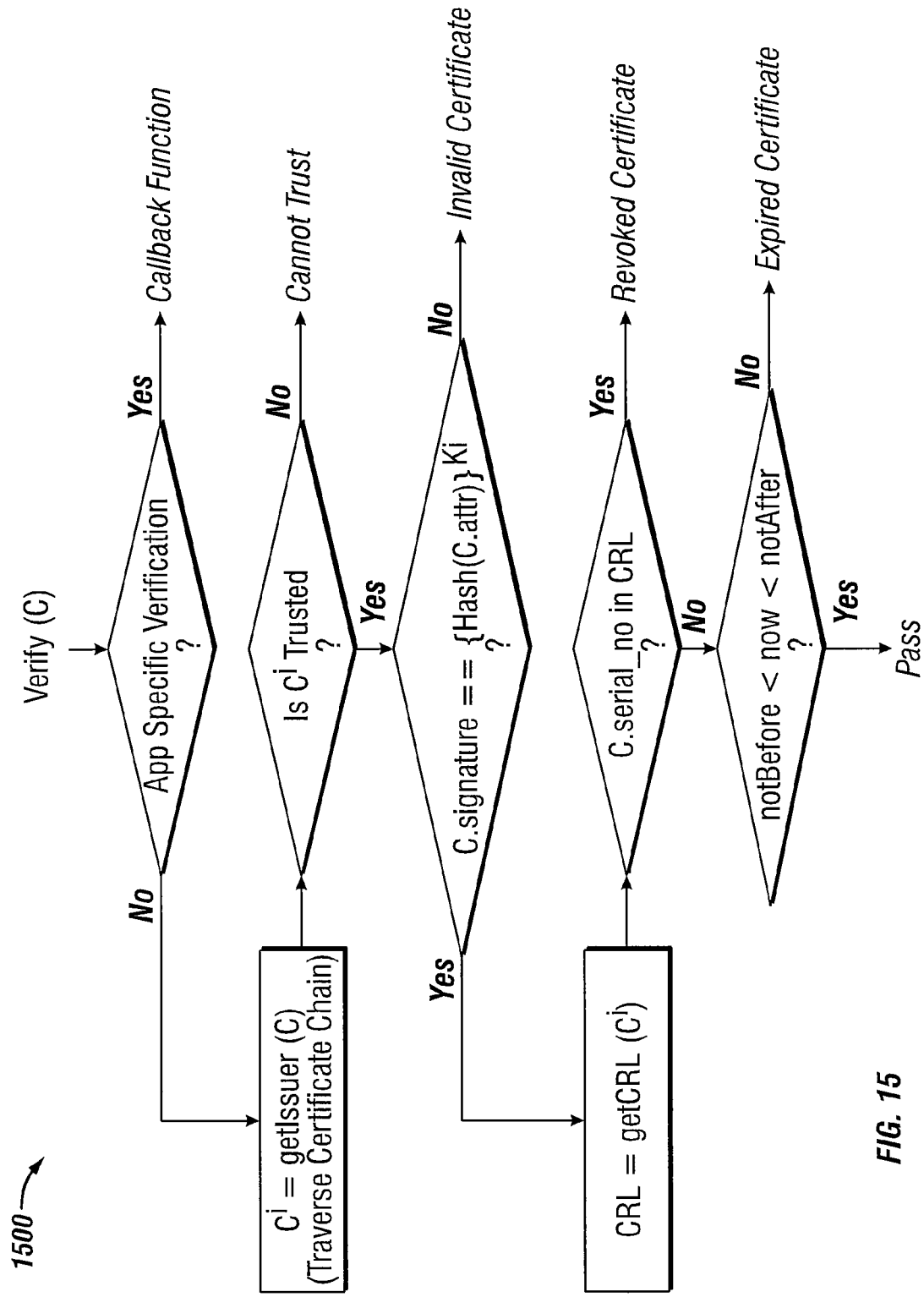
FIG. 15 is a flowchart illustrating a method, according to an example embodiment by which an application may verify a certificate.

FIG. 9 is a swim lane flowchart illustrating a method 900, according to an example embodiment, to establish a secure session or connection between a local network traffic processor (e.g., a CS NTP) and an application installed on a machine operating in an untrusted or unsecured environment. FIGS. 10 and 11 illustrate further architectural details of a client-side network traffic processor 1000, and a server-side network traffic processor 1100, respectively. FIG. 12 is a diagram illustrating a method 1200, according to an example embodiment, whereby a local certification authority (CA) may issue a proxy server certificate to a local network traffic processor, and may also provide a certification authority (CA) certificate for a local certification authority to an application. FIGS. 13 and 14 provide examples of digital certificates that may be issued by the local certification authority, while FIG. 15 is a flowchart illustrating a method 1500, according to an example embodiment, by which an application may verify a certificate.

The method 900 begins at operation 902 with the addition of a local certification authority (CA) certificate 812 to a "trust list" maintained by the application 806. FIG. 8 shows a CA certificate 812 as being added to the application 806. The addition of a local CA certificate 812 to a "trust list" of an application provides one example of a manner in which an application 806 may be configured to trust a proxy server certificate, signed by a local certification authority, and issued by the client-side network traffic processor 802.

The configuration of the application 806 to trust a certificate of the client-side network traffic processor 802 may be based upon a determination that the client-side network traffic processor 802 and the application 806 are resident or hosted on a common (e.g., local) client machine 804, or that the client-side network traffic processor 802 is otherwise hosted on a host trusted by a user of the application 806. This determination may, in one example embodiment, be made by an installer 1003 (see FIG. 10) that is responsible for installation of the client-side network traffic processor 802 on the client machine 804, and that may be part of the client-side network traffic processor 802. As part of the installation of the client-side network traffic processor 802, the installer 1003 may also, as illustrated in FIG. 10, add the CS NTP CA 812 to a trusted list of the application 806. Of course, the determination that the client-side network traffic processor 802 and the application 806 are resident on the common computer system could be made in any number of ways. However, in the embodiment illustrated in FIG. 10, the addition of the CS NTP CA certificate 812 to the "trusted list" at operation 902 may be performed by the installer 1003 as part of the install process for the client-side network traffic processor 802. The installer 1003 may likewise configure many other applications, resident on the client machine 804 and with which the client-side network traffic processor 802 establishes connections, in a similar way to trust a certificate of the client-side network traffic processor 802.

FIG. 10 also illustrates that a local (or CS NTP) certification authority (CA) 1004 may be incorporated within, form part of, or otherwise be associated with the client-side network traffic processor 802, and may provide a certificate 1012 for the CS NTP CA 1004 (e.g., to the installer 1003, which may be a component of the client-side network traffic processor 1002) so that the CS NTP CA 1004 within the "trusted list" of certification authorities for the application 806. Otherwise, as illustrated in FIG. 12, the CS NTP CA 1004 may provide the certificate 1012 directly into the application 806, without involvement of the installer 1003. This operation may be repeated if the application 806 or the client-side network traffic processor 802 is upgraded, for example.

Returning to the method 900 depicted in FIG. 9, at operation 904, the application 806 initiates a connection to the server 810. The connection is intercepted by the client-side network traffic processor 802 at operation 906, and inner and outer TCP connections are set up between the application 806, the client-side network traffic processor 802, the server-side network traffic processor 808, and the server 810.

A ClientHello message is intercepted by the client-side network traffic processor 802, which, at operation 910, performs an SSL handshake with the server-side network traffic processor 808 in order to establish the secure inner connection 414. The original ClientHello message is stored at the client-side network traffic processor 802 and used to request a handshake with the server 810. In response to the handshake request, the server-side network traffic processor 808, at operation 912, initiates an SSL handshake with the server 810. At operation 914, during the SSL handshake, the server 810 provides a server certificate, which includes a server identifier (e.g., a server common name (CN) or other identifying information), to the server-side network traffic processor 808.

At operation 916, the server-side network traffic processor 808 parses the server certificate, extracts the server identifier from the certificate, and sends the server identifier to the client-side network traffic processor 802. The client-side network traffic processor 802 receives the server identifier at operation 918. As noted elsewhere, the server identifier may comprise the common name (CN) or alternative names of the server 810.

At operation 920, the client-side network traffic processor 802 generates a key pair for the destination server 810. The CS NTP CA 1004 associated with the client-side network traffic processor 802 then issues a proxy server certificate At operation 922, the client-side network traffic processor 802 completes the SSL handshake with the application 806, started with the original ClientHello message. Furthermore, the client-side network traffic processor 802 may perform a "graceful" pass-through of the connection if a problem arises when talking to the server-side network traffic processor 808. Examples of these problems include but not limited to the following: lack of trust between NTPs, incorrect configuration of the S-NTP, handshake failures between S-NTP and the server.

At operation 924, the application 806 verifies the certificate to complete the SSL handshake and establish the secure outer connection 412 to the client-side network traffic processor 802.

In the example method 900, it will be appreciated that the application 806 is configured (e.g., by the addition of a local CA certificate to its list of trusted certification authorities) to trust the CS NTP CA 1004. Further, the client-side network traffic processor 802 is associated with the same CS NTP CA 1004. The client-side network traffic processor 802 and the application 806 may be closely coupled, as a result of verifying or otherwise determining that both of these entities are resident on a common computer system or machine. Because a further application (e.g., browser) installed on another client machine (e.g., the client machine 710 described above with reference to FIG. 7) will not include the certificate for the CS NTP CA 1004 within its list of trusted certification authorities, such an application will fail to verify the proxy server certificate presented by the client-side network traffic processor 802. Consequently, the application will fail to establish a secure connection with the client-side network traffic processor 802.

FIG. 13 is a table illustrating, at a high level, the structure of an example digital certificate 1300 that may be generated by a certification authority (CA), such as the CS NTP CA 1004, at operation 920. The digital certificate 1300 includes a public key 1302 of the server 810, a server identifier, in an example form of a common name 1304 (and also alternate names) of the server (e.g., of a server 810), a validity period 1306 indicating a time period for which the digital certificate 1300 is valid, an identifier for the issuer 1308 (e.g., the CS NTP CA 1004) of the digital certificate 1000, and a digital signature 1310 (e.g., derived from the CS NTP CA 1004 private key).

FIG. 14 provides a more detailed example of the contents of an example digital certificate 1400.

FIG. 15 is a flowchart illustrating a method 1500, according to an example embodiment, using which the application 806 may verify the certificate at operation 924, described above with reference to FIG. 9.

Figure 16:
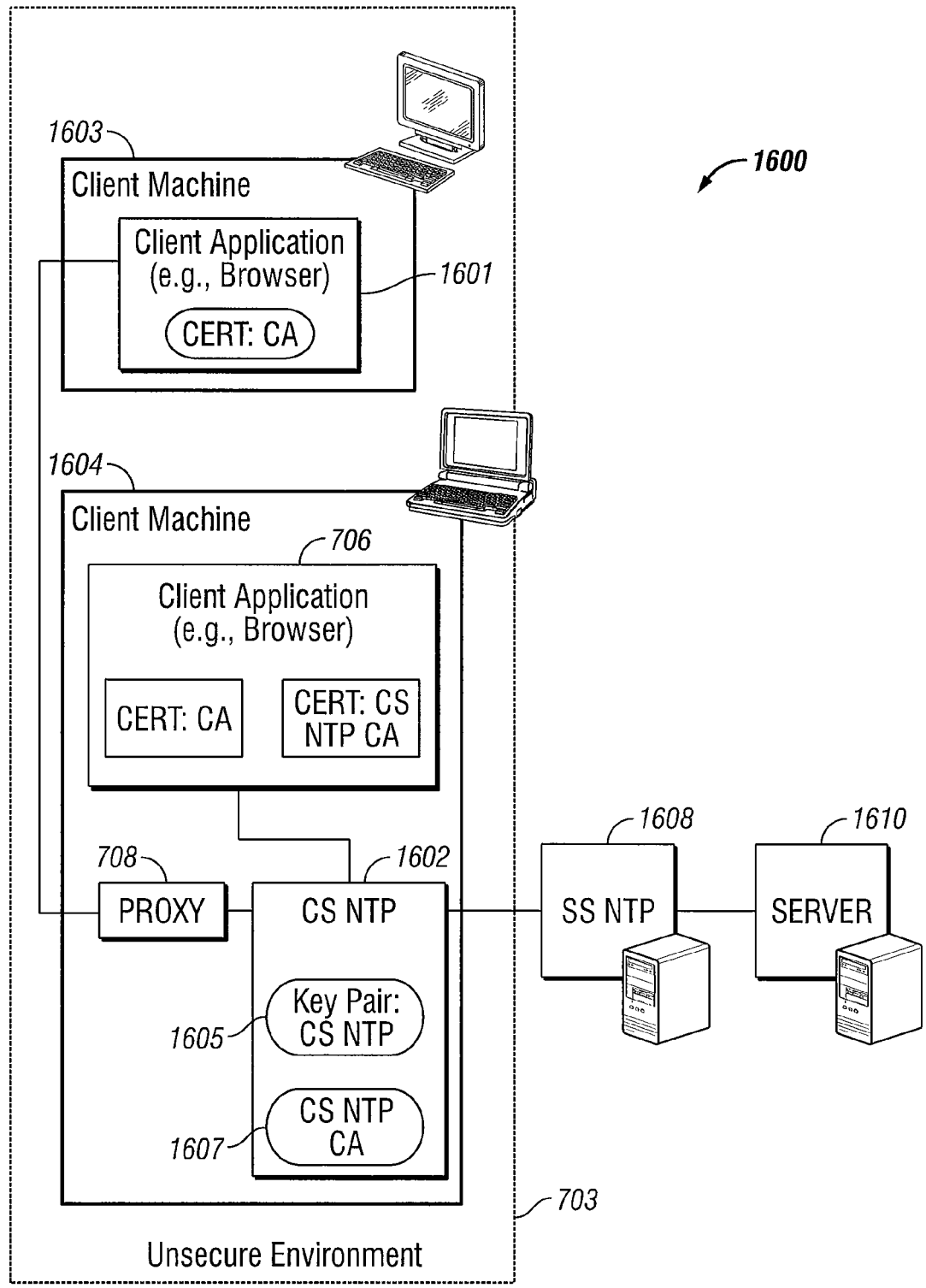
FIG. 16 is a diagrammatic representation of a network traffic processing system, according to an example embodiment.

FIG. 16 is a diagrammatic representation of a system 1600 configured as described above with reference to FIG. 9. The system 1600 shown in FIG. 16 illustrates a victim of the "man-in-the-middle" scenario in which a client application 1601 (e.g., a browser) is presented with a server proxy certificate by the client-side network traffic processor 1602 that is signed by the local (or CS NTP) certification authority (CA) 1607 associated with the client-side network traffic processor 1602. As the client application 1601 does not recognize the signer of the certificate because the local CA 1607's certificate is not within the "trusted list" of the client application 1601, the connection is not perceived to be secure.

More specifically, a "man-in-the-middle" (e.g., network traffic processor proxy) attack scenario may unfold as follows. The client application 1601 resident on the client machine 1603 makes a connection to the server 1610. This connection is redirected to a client machine 1604 (e.g., a notebook) running the client-side network traffic processor 1602, and the proxy application 708 accepts the connection. The proxy application 708 then opens its own connection to the server 1610 which is intercepted by the client-side network traffic processor 1602. From here on the proxy application 708 needs only to forward data going into each direction. The client application 1601 initiates an SSL handshake by sending a ClientHello message to the server 1610. The client-side network traffic processor 1602 performs a handshake with a server-side network traffic processor 1608, which in turn performs an SSL handshake with the server 1610. The client-side network traffic processor 1602 receives a server identifier (e.g., a server certificate, portion of a server certificate, or information from a server certificate such as a common name (CN) or alternate name) of the server 1610, and generates a proxy certificate. The client-side network traffic processor 1602 then attempts to complete a handshake with the client application 1601. The client application 1601 is configured with known certificate authorities and can verify the server's certificate (e.g., a CA-signed certificate). The client application 1601 is further not aware of any CA running on the client machine 1604. Accordingly, the client application 1601 fails to verify the presented proxy certificate and is unable to make a secure connection. Accordingly, the client application 1601 may drop the connection to the client machine 1604, or present a dialog box to the user warning of a security issue, depending on the security settings of the client application 1601.

When comparing a configuration of a network traffic processing system as described with respect to FIG. 8 (where the client-side network traffic processor 802 is in an untrusted and/or unsecured environment) with the configuration of the system as described with respect to FIG. 4 (where the client-side network traffic processor is determined to be in a secure and trusted environment), it will be appreciated that, in an example embodiment, a server-side network traffic processor differentiates between client-side network processors depending on the security of the environment in which the client-side network traffic processor is operating.

To this end, FIG. 11 shows that a server-side network traffic processor 1100 may maintain multiple categories of (1) certificates for peered or paired client-side network traffic processors and/or (2) certificates of issuers of such peer certificates (e.g., CA's that sign groups of peers). For example, the server-side network traffic processor 1100 may maintain a first category 1106 of secure environment certificates and a second category 1108 of unsecured environment certificates. In one example, a certificate for a client-side network traffic processor may be configured on the server-side network traffic processor 1100 using a "trusted" certificate category (e.g., either the first category 1106 of secure environment certificates or second category 1108 of unsecured environment certificates). The categorization of certificates may also be implemented by maintaining lists of issuers of secure and unsecure peer certificates. A peering certificate for a particular client-side network traffic processor may be signed by the controller, and accordingly the server-side network traffic processor 1100 may use the issuer's certificate to check or otherwise determine a level of trust for a particular peer client-side network traffic processor.

For example, the "untrusted" category 1108 may contain a list of issuers of untrusted or unsecure certificates. Assuming that a client-side network traffic processor is able to authenticate itself to a server-side network traffic processor, an issuer of a certificate for the client-side network traffic processor is looked at within the categories 1106 and 1108. If the issuer is found to be an issuer of untrusted certificates, then the peer is assumed to be in an unsecure environment, and the more stringent connection protocol, as described herein, may be implemented by the server-side network traffic processor.

Figure 17:
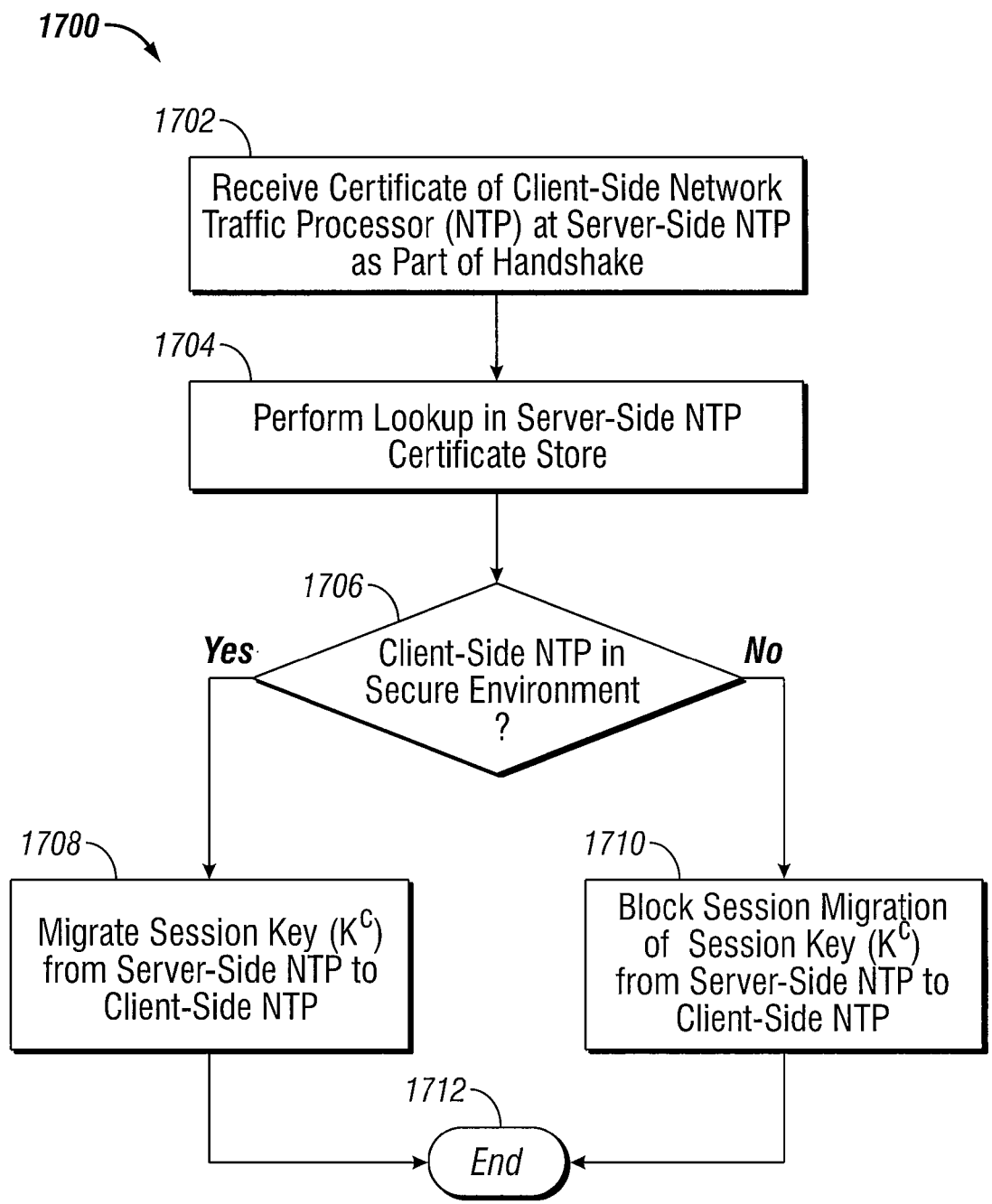
FIG. 17 is a flowchart illustrating a method, according to an example embodiment, to configure a network traffic processing system.

FIG. 17 is a flowchart illustrating a method 1700, according to an example embodiment, to configure a network traffic processing system. Following a successful SSL handshake between a client-side network traffic processor and a server-side network traffic processor 1100, the method 1700 commences at operation 1702 with receipt of a certificate of the client-side network traffic processor at the server-side network traffic processor 1100. The server-side network traffic processor 1100 then performs a lookup, at operation 1704, to determine a "trust level" for the peer client-side network traffic processor within a certificate store. In other embodiments, the certificate of the client-side network traffic processor 1000 may be used in other ways to assess a "trust level" for an environment in which the client-side network traffic processor is deployed.

At decision block 1706, a determination is made as to whether the client-side network traffic processor 1000 is operating in a secure environment (e.g., is a client-side network traffic processor operating as an appliance device in an environment controlled by a network administrator). If so, at operation 1708 the controller 1102 initiates a migration of a session key (e.g., KC, as described in with reference to FIG. 1) from the server-side network traffic processor to the client-side network traffic processor, whereof the method 1700 terminates at operation 1712. On the other hand, should the determination be made at decision block 1706 that the peered client-side network traffic processor is not operating within a secured environment, the migration of the session key (e.g., KC) from the server-side network traffic processor to the client-side network traffic processor is blocked at operation 1710. At this point the server-side NTP may enforce the more stringent version of the protocol where the session key is not migrated and the client-side NTP is then forced to complete a handshake with the client application.

Figure 18:
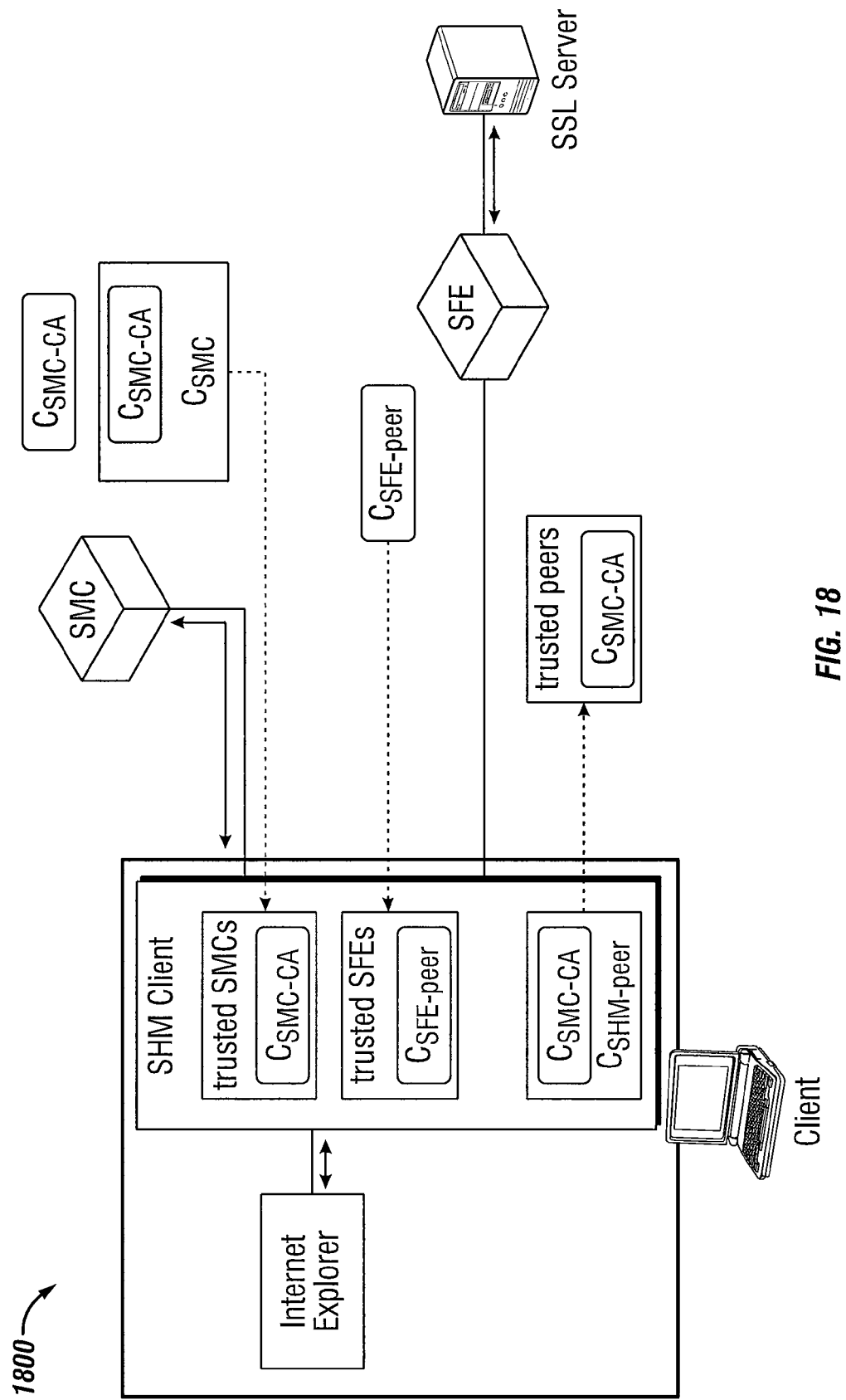
FIG. 18 is a diagrammatic representation of a network traffic processing system, according to an example embodiment, to differentiate in treatment of network traffic processors based on a level of trust.

FIG. 18 is a diagrammatic representation of a network traffic system 1800, configured according to a further example embodiment, to differentiate in treatment of network traffic processors (e.g., client-side network traffic processors) based on a level of trust. The level of trust in a particular network traffic processor may be dependent on an assumed environment in which a particular processor is operating. For example, a processor operating in a secure, network administrator-controlled environment, may be afforded a higher level of trust than a mobile processor or a processor operating in a environment outside the control of a network administrator.

Figure 19:
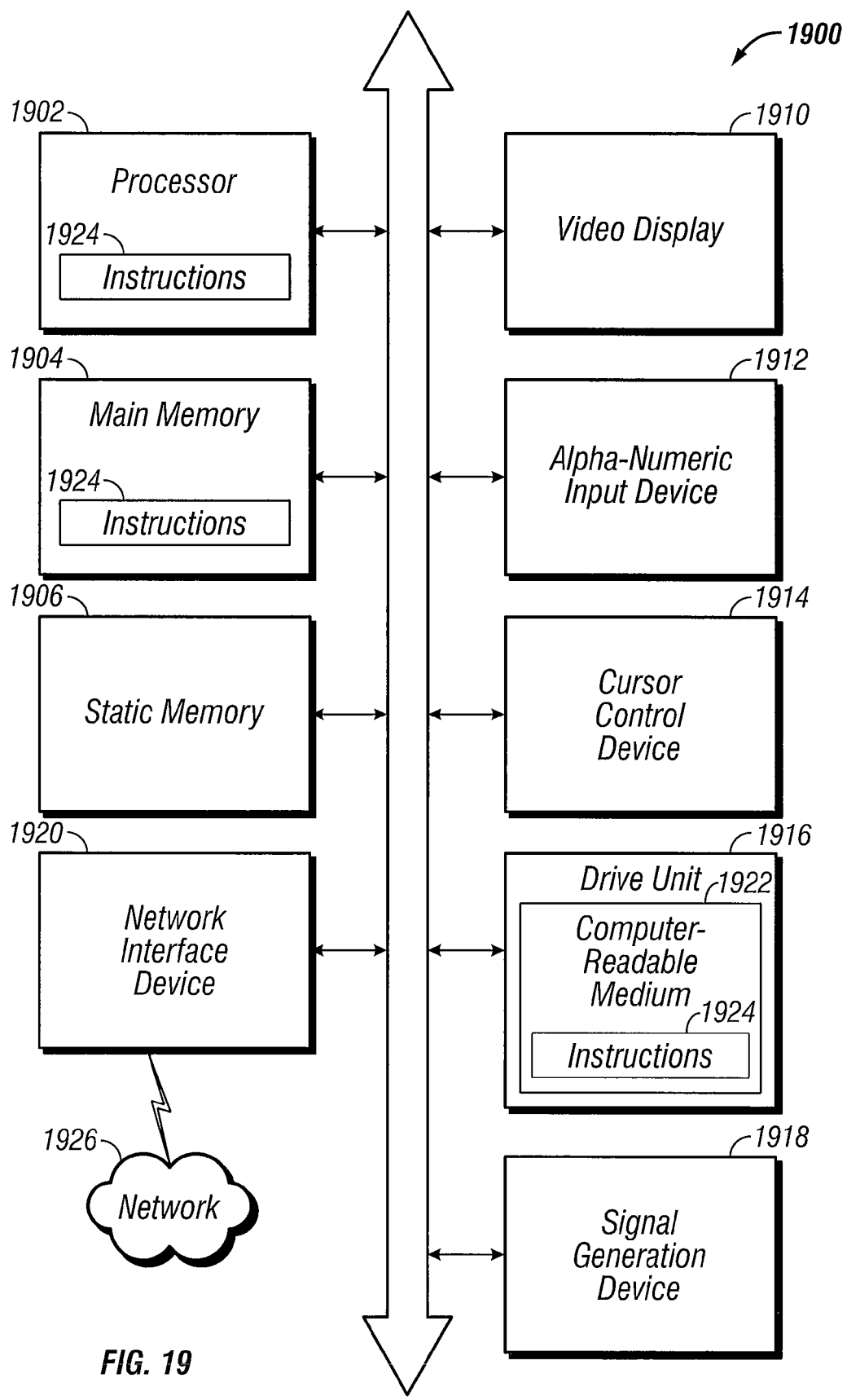
FIG. 19 is a block diagram of machine in the example form of a computer system within which a set instructions, for causing the machine to perform any one or more of the methodologies discussed herein, may be executed.

As shown in FIG. 18, operational configuration may be as follows:
(1) Run a CA on the controller:
  a. C_smc-ca: the issuer's cert, so we can have multiple controllers
  b. C_smc{C_smc-ca} the given controller's cert issued by the main C_smc-ca
(2) Every client-side network traffic processor will have a list of trusted controllers:
  a. C_smc-ca cert
(3) Configure the controller's certificate on the server-side network traffic processor using the right "Trust" category
  a. C_smc-ca is used (e.g., copies to the SS NTP)
(4) The client-side network traffic processor's peering cert will be issued by the controller
  a. C_shm-peer {C_smc-ca} is the keypair+cert that client-side network traffic processor use
(5) Every client-side network traffic processor will have a list of trusted peers:
  a. C_sfe-peer cert
(6) Server-side network traffic processors will be able to check who the peer is based on the trust chain Example Machine Architecture and Machine-Readable Medium FIG. 19 is a block diagram of machine in the example form of a computer system 1900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU) or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard), a cursor-control device 1917 (e.g., a mouse), a disk drive unit 1916, a signal generation device 1918 (e.g., a speaker) and a network interface device 1920.

Machine-Readable Medium

The disk drive unit 1916 includes a machine-readable medium 1922 on which is stored one or more sets of instructions and data structures (e.g., software) 1924 embodying or utilized by any one or more of the methodologies or functions described herein. The instructions 1924 may also reside, completely or at least partially, within the main memory 1904 and/or within the processor 1902 during execution thereof by the computer system 1900, the main memory 1904 and the processor 1902 also constituting machine-readable media.

While the machine-readable medium 1922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1924 may further be transmitted or received over a communications network 1926 using a transmission medium. The instructions 1924 may be transmitted using the network interface device 1920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Modules, Components and Logic

Certain embodiments are described herein as including logic or a number of hardware or software components, modules, or mechanisms. A computer hardware module is tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a computer hardware module that operates to perform certain operations as described herein.

In various embodiments, a computer hardware module may be implemented mechanically or electronically. For example, a computer hardware module may comprise dedicated circuitry or logic that is permanently configured (e.g., as a special-purpose processor) to perform certain operations. A computer hardware module may also comprise programmable logic or circuitry (e.g., as encompassed within a general-purpose processor or other programmable processor) that is temporarily configured by software to perform certain operations. It will be appreciated that the decision to implement a computer hardware module mechanically, in dedicated and permanently configured circuitry, or in temporarily configured circuitry (e.g., configured by software) may be driven by cost and time considerations.

Accordingly, the term "computer hardware module" should be understood to include a tangible entity, be that an entity that is physically constructed, permanently configured (e.g., hardwired) or temporarily configured (e.g., programmed) to operate in a certain manner and/or to perform certain operations described herein. Considering embodiments in which computer hardware modules are temporarily configured (e.g., programmed), each of the computer hardware module s need not be configured or instantiated at any one instance in time. For example, where the computer hardware modules comprise a general-purpose processor configured using software, the general-purpose processor may be configured as respective different components at different times. Software may accordingly configure a processor, for example, to constitute a particular component at one instance of time and to constitute a different component at a different instance of time.

Software and hardware modules can provide information to, and receive information from, other modules. Accordingly, the described modules may be regarded as being communicatively coupled. Where multiple modules such as those described exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Electronic Apparatus and System

Example embodiments may be implemented in digital electronic circuitry, in computer hardware, firmware, software, or in combinations of these. Example embodiments may be implemented using a computer program product, e.g., a computer program tangibly embodied in a non-transient manner in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and an apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware, may be a design choice. Below are set out hardware (e.g., machine) and software architectures that may be deployed in various example embodiments.

What is claimed is:

1. A method comprising:
   determining that a local network traffic processor and a networked application are installed on a common trusted host;
   in response to the determination, configuring the networked application to trust a server proxy certificate generated, using a server identifier, for a server associated with a remote network traffic processor that is issued and signed by a local certification authority unique to and associated with the local network traffic processor, the local network traffic processor operatively being paired with the remote network traffic processor to perform a network traffic processing function; and
   using a proxy server certificate to establish a secure session between the local network traffic processor and the networked application.

2. The method of claim 1, wherein the determination that the local network traffic processor is on a trusted host comprises determining that the local network traffic processor and the application are resident on a common computer system that is the trusted host.

3. The method of claim 1, wherein the application comprises an SSL-enabled browser application and the configuring of the application to trust the server proxy certificate includes configuring the SSL-enabled application to trust an authority.

4. The method of claim 3, wherein the configuring of the SSL-enabled application to trust the authority includes adding a certification authority (CA) certificate for the authority to a trusted certificate store used by the SSL-enabled application.

5. The method of claim 1, including:
   generating a private/public key pair for the server;
   providing the public key of the private/public key pair to the authority; and
   issuing the proxy server certificate, comprising the public key of the server signed using the private key of the authority, from the authority.

6. The method of claim 1, including:
   receiving, from the remote network traffic processor and at the local network traffic processor, a server identifier; and
   generating the proxy server certificate at the authority using a private key of the local network traffic processor that is unique to the local network traffic processor.

7. The method of claim 6, wherein the server identifier for a server comprises at least one of a common name or an alternate name of the server.

8. The method of claim 1, wherein the local network traffic processor comprises a local traffic accelerator that operatively accelerates network traffic communicated with a remote traffic accelerator.

9. The method of claim 1, wherein the authority forms part of the local network traffic processor.

10. A system comprising:
    a configuration application to:
    install a local network traffic processor and an networked application on a common trusted computer system; and
    configure the networked application to trust a server certificate of the local network traffic processor, the local network traffic processor operatively being paired with a remote network traffic processor,
    a local certification authority (CA), unique to and associated the local network traffic processor, to issue and sign a proxy server certificate using a server identifier for a server associated with the remote network traffic processor; and
    the networked application to use the proxy server certificate to establish a secure session between the local network traffic processor and the networked application.

11. The system of claim 10, wherein the networked application comprises a browser application and the configuring of the networked application to trust the server certificate includes configuring the browser application to trust the local CA.

12. The system of claim 10, wherein the configuration application is to add a certification authority certificate for the local CA to a trusted certificate store used by the networked application.

13. The system of claim 10, including:
    generating a private/public key pair for the server;
    providing at least the public key of the private/public key pair to the local certification authority; and
    issuing the proxy server certificate from the local CA.

14. The system of claim 10, including:
    receiving, from the remote network traffic processor and at the local network traffic processor, the server identifier; and
    generating the proxy server certificate at the local certification authority (CA) using a key pair generated for the server.

15. The system of claim 10, wherein the local network traffic processor comprises a local traffic accelerator that operatively accelerates network traffic communicated with a remote traffic accelerator.

16. The system of claim 10, wherein the local CA forms part of the local network traffic processor.

17. The system of claim 10, wherein the server identifier for the server comprises at least one of a common name, an alternate name or an X509 attribute of the server.

18. A non-transitory machine-readable medium storing instructions that, when executed by a computer system, cause the computer system to perform a method comprising:
configuring a networked application to trust a proxy server certificate, using a server identifier for a server associated with a remote network traffic processor, that is issued and signed by a local certification authority, unique to and associated with a local network traffic processor installed on a common trusted host with the networked application, the local network traffic processor operatively being paired with the remote network traffic processor; and
using a proxy server certificate to establish a secure session between the local network traffic processor and the networked application.

19. A method comprising:
configuring a networked application to trust a proxy server certificate using a server identifier for a server associated with a remote network traffic processor, that is issued and signed by a local certification authority, unique to and associated with a local network traffic processor installed on a common trusted host with the networked application, the local network traffic processor operatively being paired with the remote network traffic processor; and
using a proxy server certificate to establish a secure session between local network traffic processor and the networked application.

20. The method of claim 19, wherein the networked application comprises an SSL-enabled browser application and the configuring of the networked application to trust the server proxy certificate includes configuring the SSL-enabled application to trust the local certification authority.

21. The method of claim 19, comprising:
generating a private/public key pair for a server;
providing the public key of the private/public key pair to the local certification authority; and
issuing the proxy server certificate, comprising the public key of the server signed using
the private key of the local certification authority, from the local certification authority.

22. The method of claim 21, wherein the configuring of the SSL-enabled application to trust the local certification authority includes adding a certification authority (CA) certificate for the local certification authority to a trusted certificate store used by the SSL-enabled application.

23. The method of claim 19, comprising:
receiving, from the remote network traffic processor and at the local network traffic processor, a server identifier; and
generating the proxy server certificate at the certification authority using a private key of the local network traffic processor that is unique to the local network traffic processor.

24. The method of claim 19, wherein the local network traffic processor comprises a local traffic accelerator that operatively accelerates network traffic communicated with a remote traffic accelerator.

\* \* \* \* \*